(12) United States Patent
Park et al.

(10) Patent No.: US 11,503,315 B2
(45) Date of Patent: Nov. 15, 2022

(54) METHOD AND APPARATUS FOR ENCODING AND DECODING VIDEO SIGNAL USING INTRA PREDICTION FILTERING

(71) Applicant: LG ELECTRONICS INC., Seoul (KR)

(72) Inventors: Naeri Park, Seoul (KR); Sunmi Yoo, Seoul (KR); Junghak Nam, Seoul (KR); Hyeongmoon Jang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 692 days.

(21) Appl. No.: 16/325,994

(22) PCT Filed: Aug. 19, 2016

(86) PCT No.: PCT/KR2016/009213
§ 371 (c)(1),
(2) Date: Feb. 15, 2019

(87) PCT Pub. No.: WO2018/034374
PCT Pub. Date: Feb. 22, 2018

(65) Prior Publication Data
US 2021/0297684 A1    Sep. 23, 2021

(51) Int. Cl.
*H04N 19/44*    (2014.01)
*H04N 19/105*    (2014.01)
(Continued)

(52) U.S. Cl.
CPC .......... *H04N 19/44* (2014.11); *H04N 19/105* (2014.11); *H04N 19/132* (2014.11);
(Continued)

(58) Field of Classification Search
CPC combination set(s) only.
See application file for complete search history.

(56) References Cited

U.S. PATENT DOCUMENTS 10,757,420 B2 *    8/2020    Zhang .................. H04N 19/503
11,032,550 B2 *    6/2021    Ye ......................... H04N 19/176
(Continued)

FOREIGN PATENT DOCUMENTS

KR    10-2012-0065953 A    6/2012
KR    10-2013-0110127 A    10/2013
(Continued)

OTHER PUBLICATIONS

International Search Report from PCT/KR2016/009213, dated Apr. 28, 2017.

*Primary Examiner* — Dave Czekaj
*Assistant Examiner* — Shanikam Brumfield
(74) *Attorney, Agent, or Firm* — Dentons US LLP

(57) ABSTRACT

The present invention provides a method for decoding a video signal, which includes: generating a first prediction block according to a prediction mode of a current block; checking the prediction mode of a neighboring block adjacent to the current block; generating a second prediction block based on the prediction mode of the neighboring block; generating a final prediction block by applying a weight to the first prediction block and the second prediction block; and reconstructing the video signal by using the final prediction block.

14 Claims, 16 Drawing Sheets

(51) Int. Cl.
*H04N 19/132* (2014.01)
*H04N 19/159* (2014.01)
*H04N 19/176* (2014.01)
*H04N 19/46* (2014.01)
*H04N 19/82* (2014.01)

(52) U.S. Cl.
CPC ......... *H04N 19/159* (2014.11); *H04N 19/176* (2014.11); *H04N 19/46* (2014.11); *H04N 19/82* (2014.11)

(56) References Cited

U.S. PATENT DOCUMENTS

| | | | | |
|---|---|---|---|---|
| 2013/0039421 | A1* | 2/2013 | Lee | H04N 19/176 375/240.13 |
| 2013/0251036 | A1* | 9/2013 | Lee | H04N 19/117 375/240.12 |
| 2015/0016521 | A1* | 1/2015 | Peng | H04N 19/192 375/240.12 |
| 2017/0251213 | A1* | 8/2017 | Ye | H04N 19/159 |
| 2019/0020888 | A1* | 1/2019 | Liu | H04N 19/593 |
| 2019/0037213 | A1* | 1/2019 | Hermansson | H04N 19/107 |
| 2019/0068989 | A1* | 2/2019 | Lee | H04N 19/513 |
| 2020/0029073 | A1* | 1/2020 | Chiang | H04N 19/105 |

FOREIGN PATENT DOCUMENTS

| | | |
|---|---|---|
| KR | 10-2015-0064406 A | 6/2015 |
| KR | 10-2015-0140848 A | 12/2015 |
| KR | 10-2016-0055772 A | 5/2016 |

\* cited by examiner

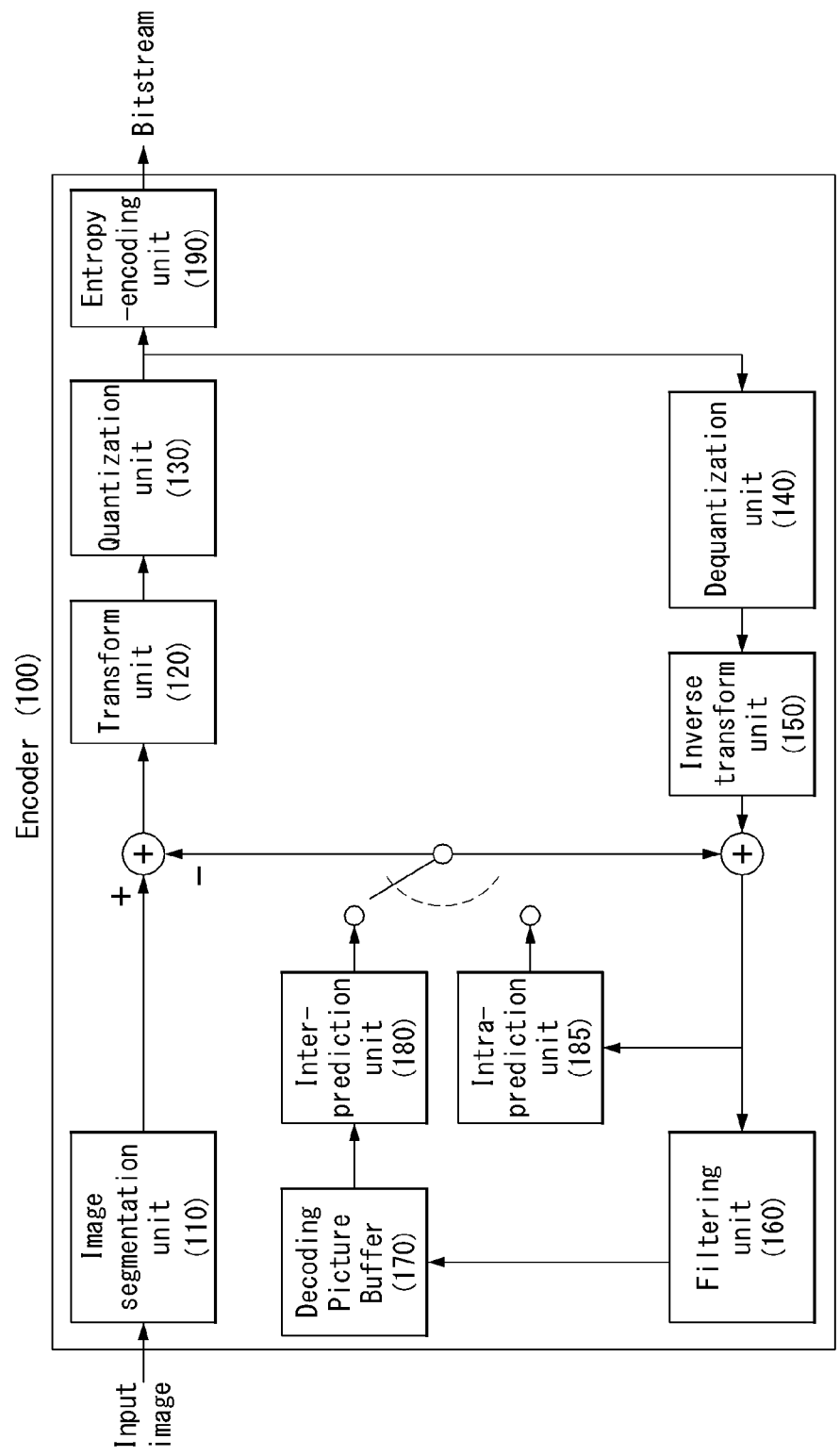
[FIG. 1]

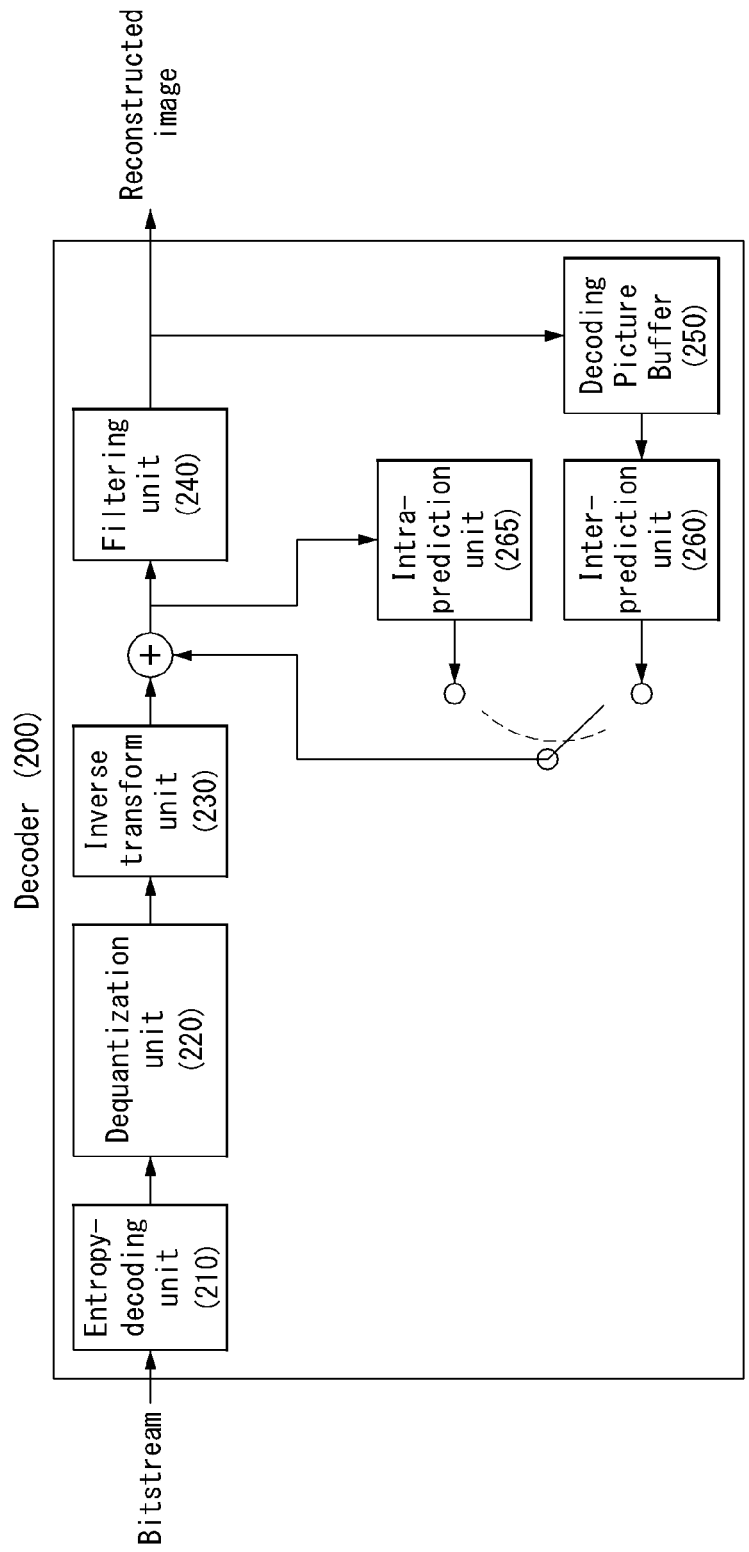
[FIG. 2]

[FIG. 3A]
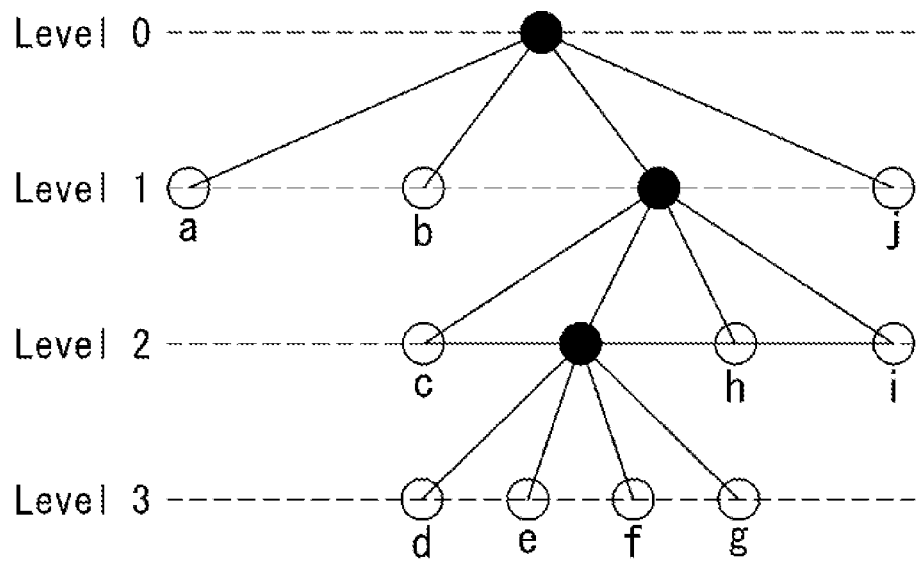
[FIG. 3B]
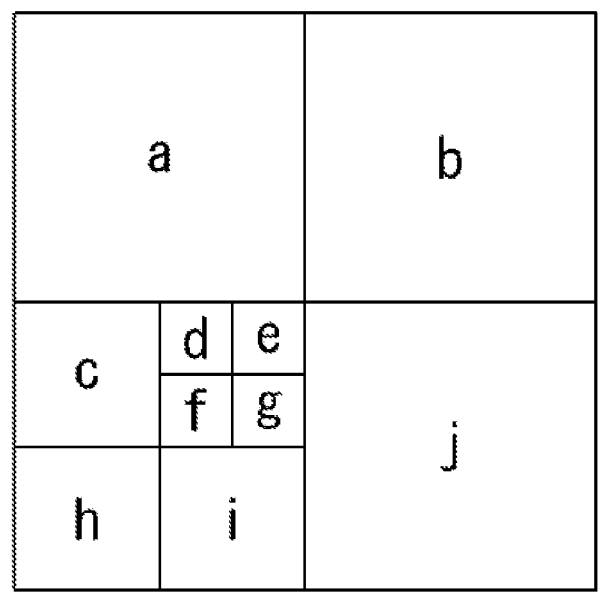

[FIG. 4]
Intra:
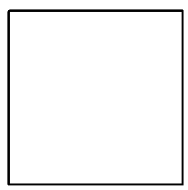 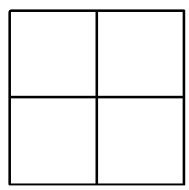
2Nx2N    NxN
Inter:
 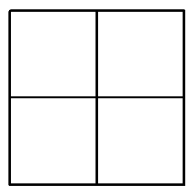 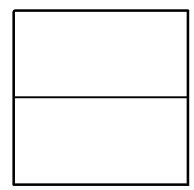 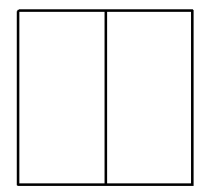
2Nx2N    NxN    2NxN    Nx2N
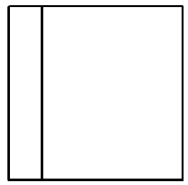 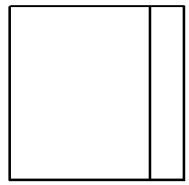 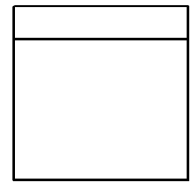 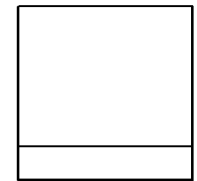
nLx2N    nRx2N    2NxnU    2NxnD

[FIG. 5]
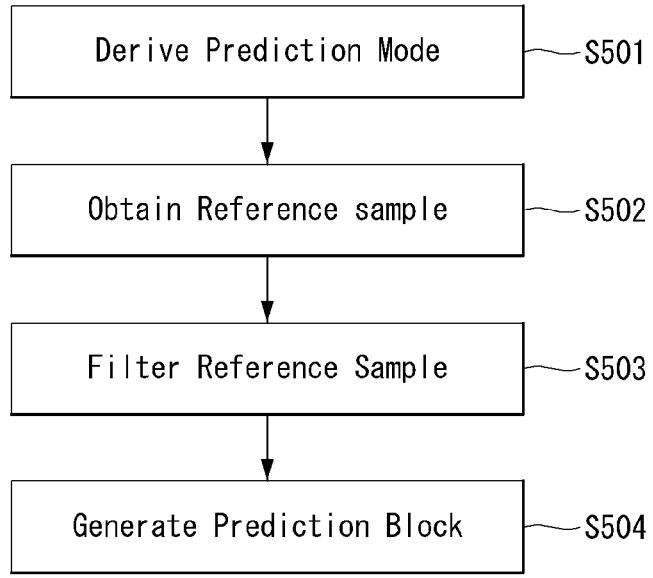
[FIG. 6]
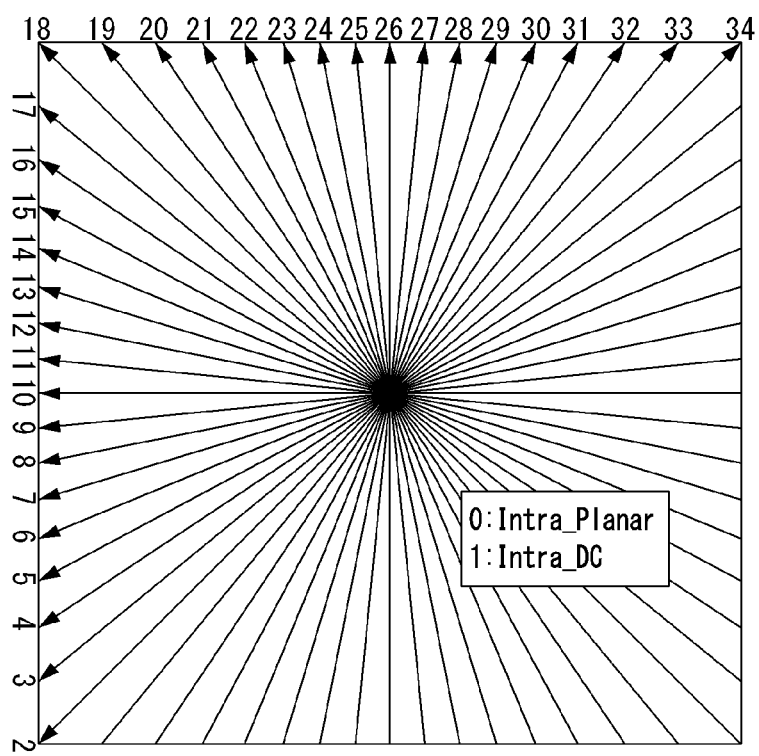

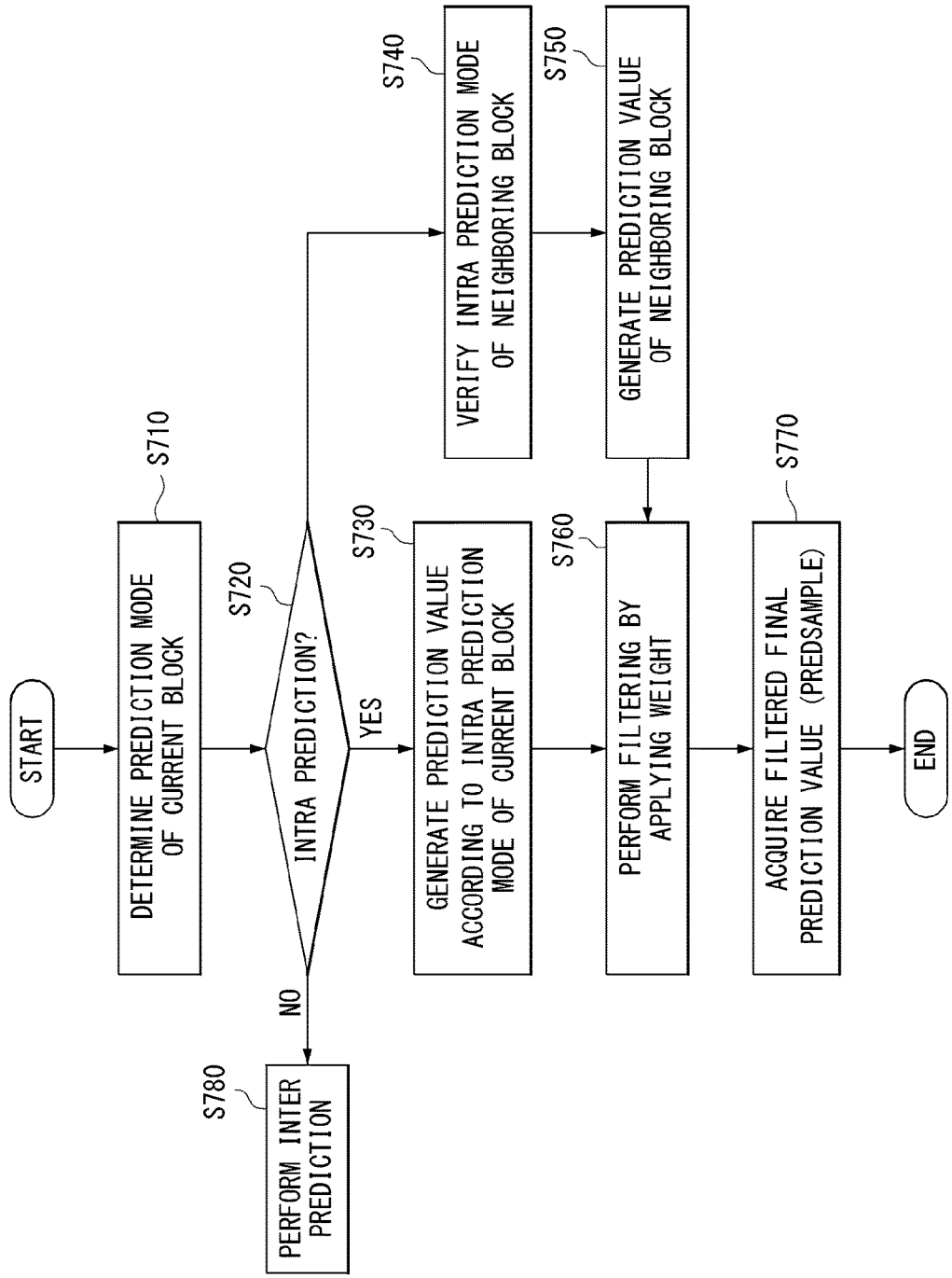
[FIG. 7]

[FIG. 8]
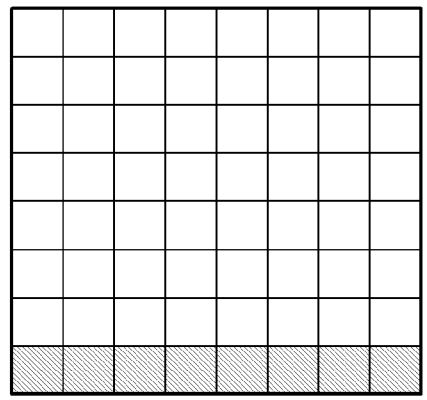
(c)
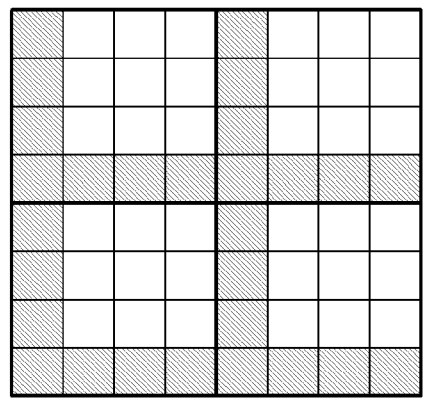
(b)
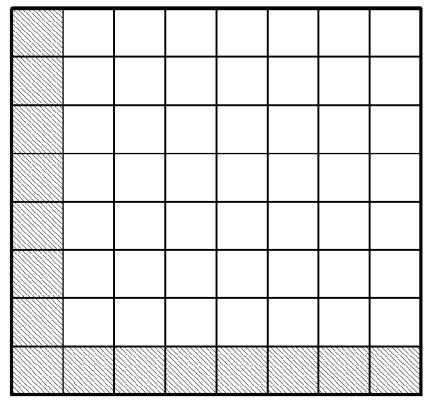
(a)

[FIG. 9]
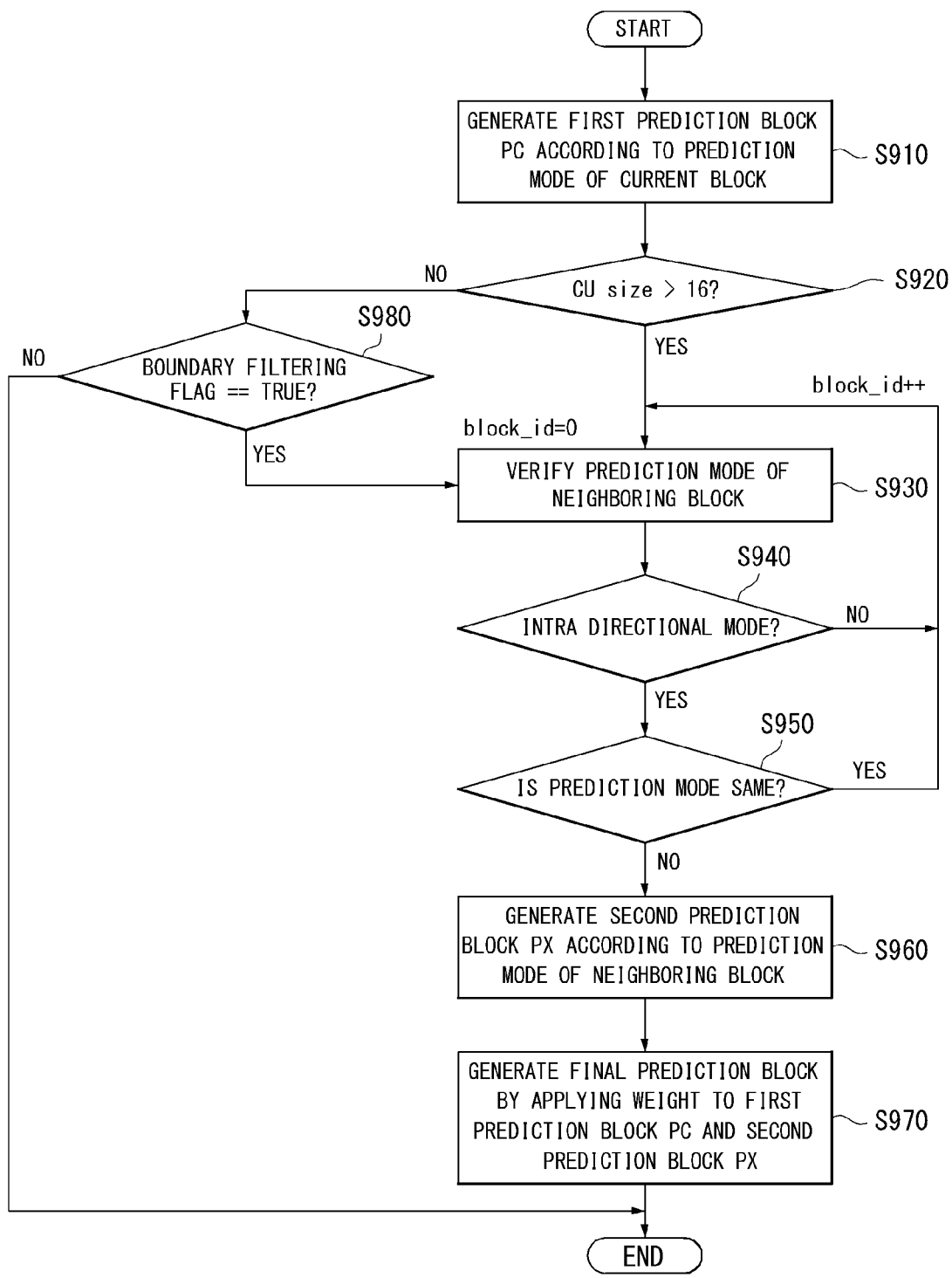

[FIG. 10]
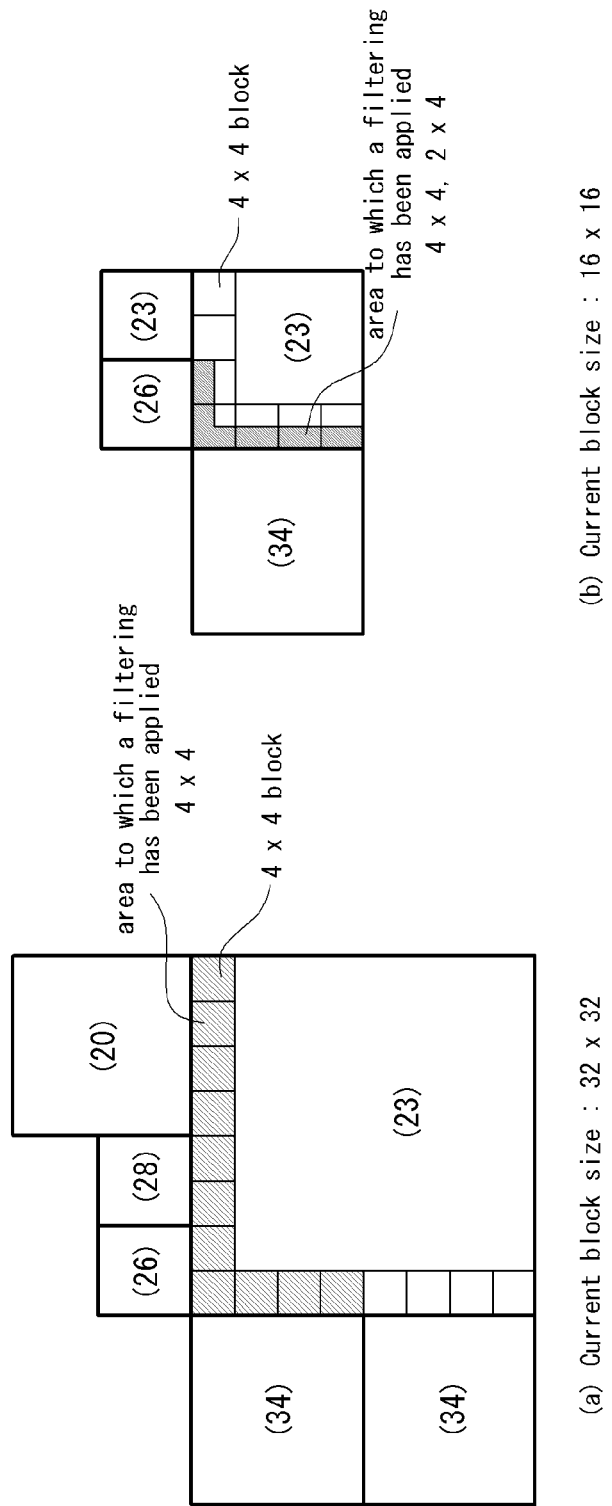

[FIG. 11]
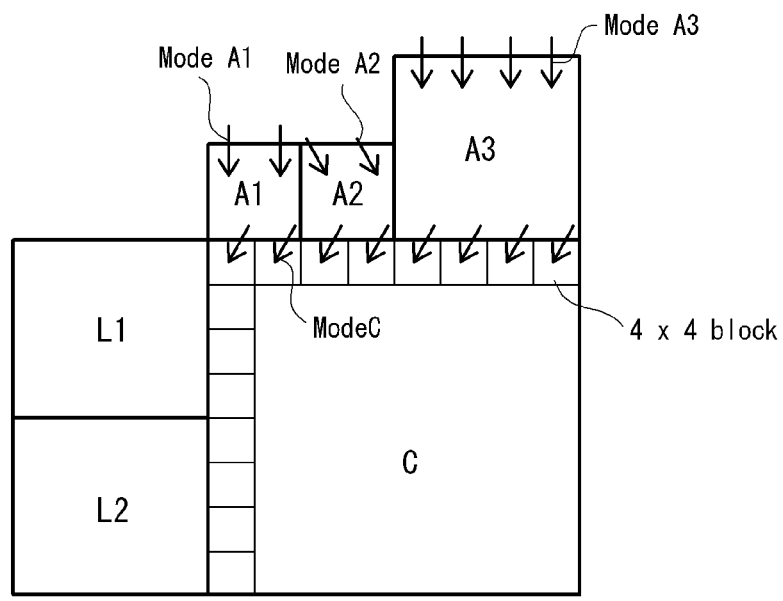
[FIG. 12]
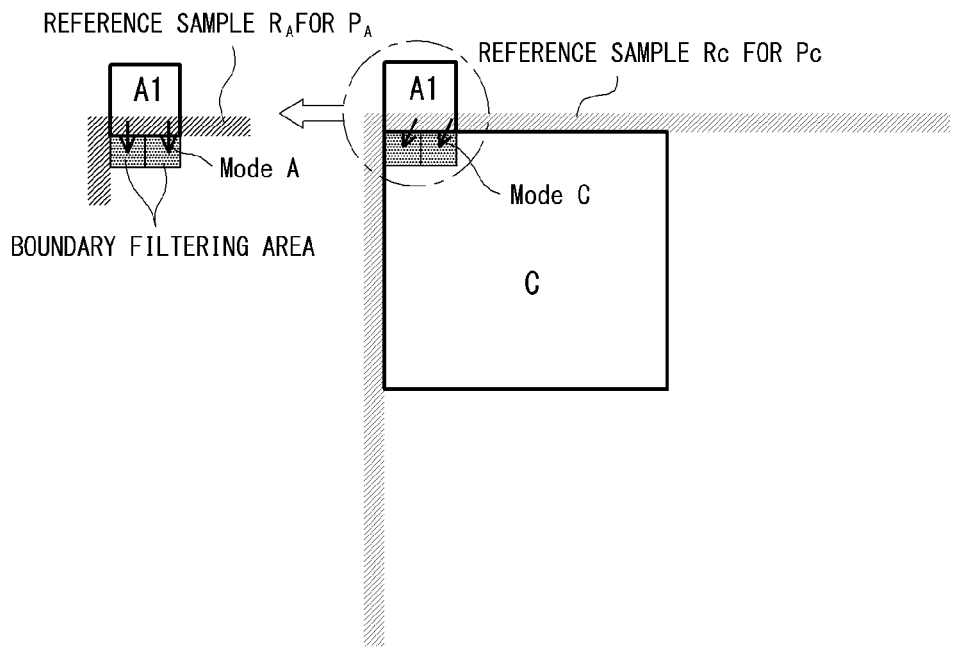

[FIG. 13]
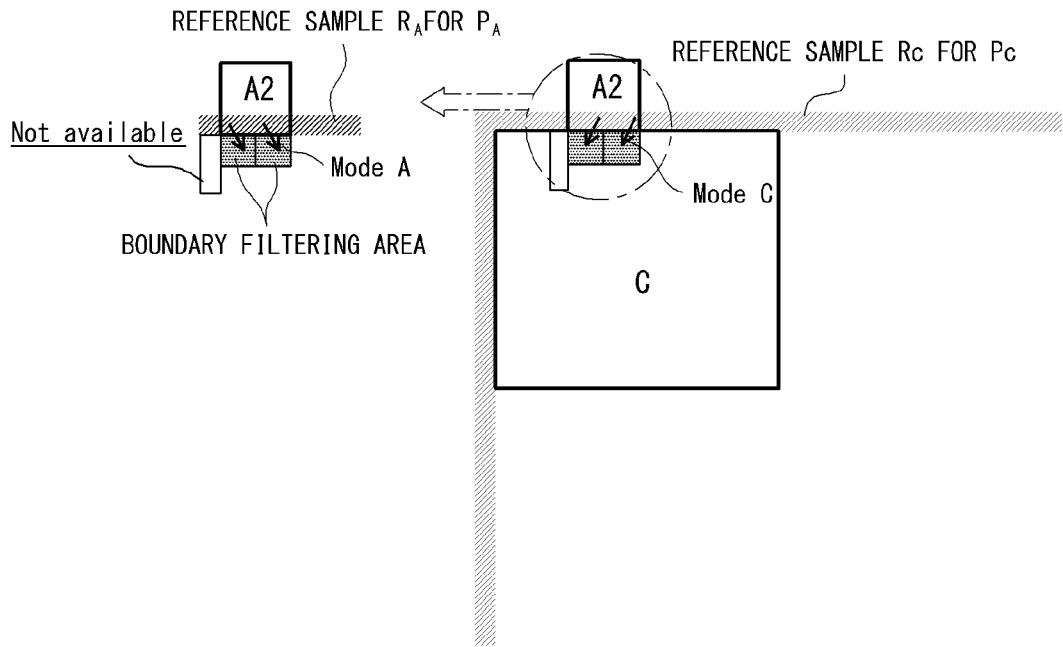
[FIG. 14]
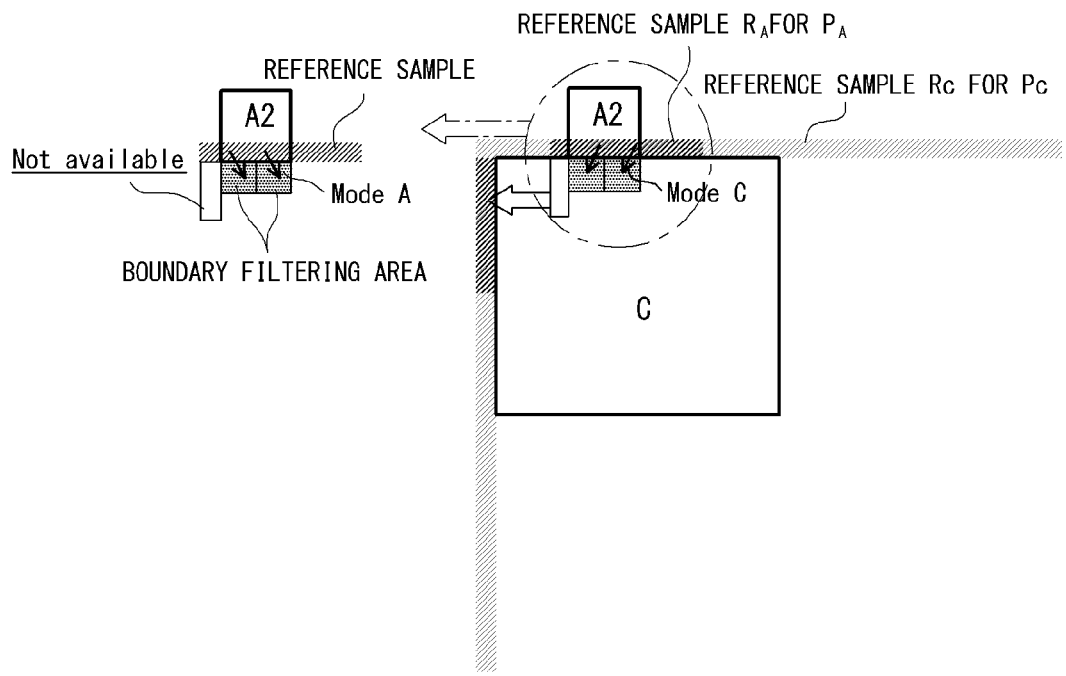

[FIG. 15]
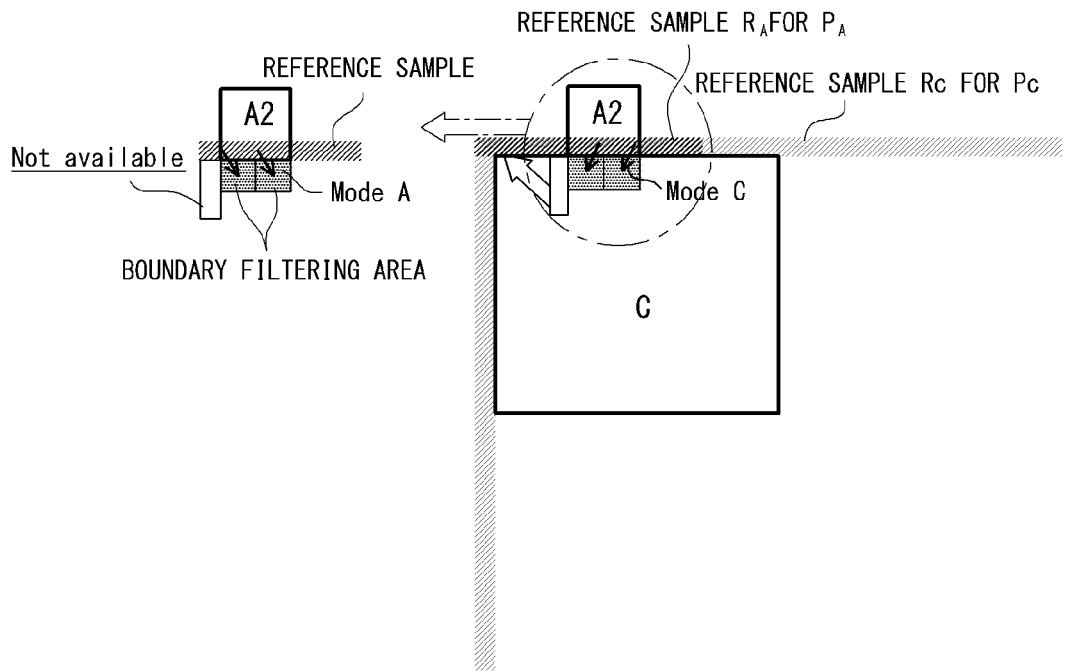
[FIG. 16]
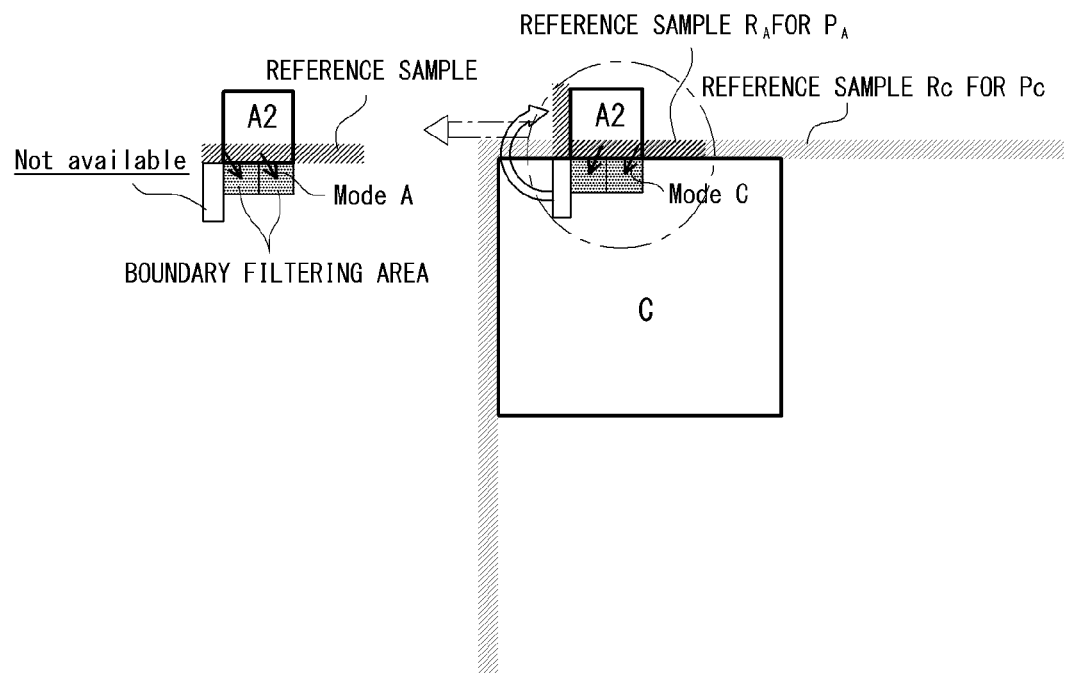

[FIG. 17]
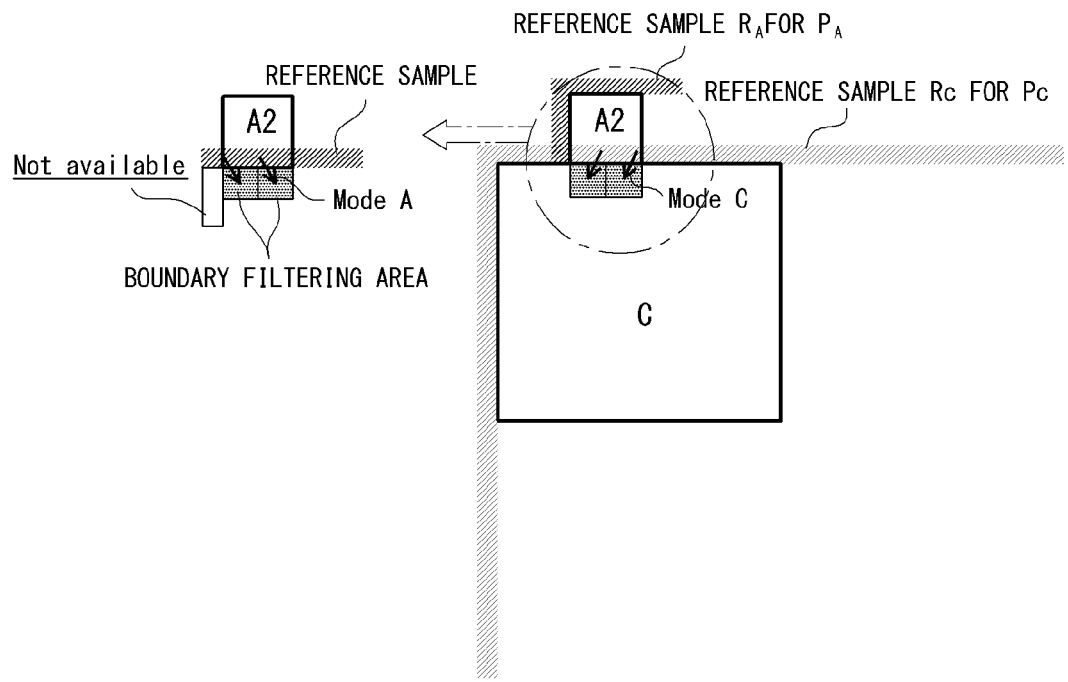
[FIG. 18]
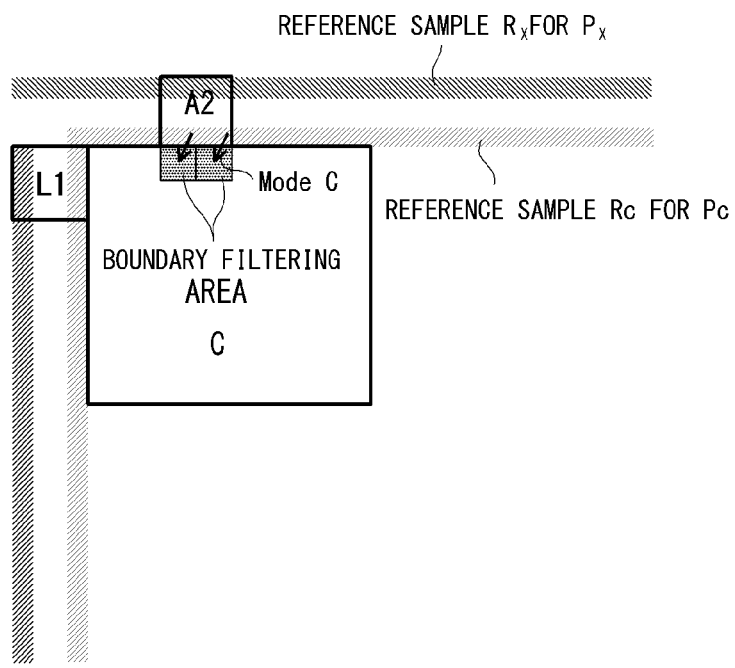

Pred$_L$
(Mode L = 30)

Pred$_C$
(Mode C = 26)

(a)

$P_L$ {A, B, C, D} = {1/4, 1/8, 1/16, 1/32}
$P_C$ {A, B, C, D} = {3/4, 7/8, 15/16, 31/32}

Pred$_L$
(Mode L = 10)

Pred$_C$
(Mode C = 26)

| | Descriptor |
|---|---|
| seq_parameter_set_rbsp( ) | |
| S2110 sps_obip_flag | u(1) |
| ... | |

(b)

| | Descriptor |
|---|---|
| coding_unit(x0, y0, log2CbSize ) | |
| ... | |
| if( CuPredMode[ x0 ][y0 ]  ==  MODE_INTRA ) | |
|   if ( PartMode  ==  PART_2Nx2N  &&  pcm_enabled_flag  && | |
|     log2CbSize >=  Log2MinIpcmCbSizeY  && | |
|     log2CbSize <=  Log2MaxIpcmCbSizeY ) | |
|     pcm_flag[ x0 ][ y0 ] | ae(v) |
|   if( pcm_flag[x0 ][y0 ] ) { | |
|     while( !byte_aligned( ) ) | |
|       pcm_alignment_zero_bit | f(1) |
|     pcm_sample( x0, y0, log2CbSize ) | |
|   } else { | |
|     pb0ffset = ( PartMode  ==  PART_NxN ) ? ( nCbS  /2 ) : nCbS | |
|     for( j = 0; j < nCbS; j = j + pb0ffset ) | |
|       for( i = 0; i < nCbS; i = i + pb0ffset ) | |
|         prev_intra_luma_pred_flag [x0 + i ][ y0 + j] | ae(v) |
|     for( j = 0; j < nCbS; j = j + pb0ffset ) | |
|       for( i = 0; i < nCbS; i = i + pb0ffset ) | |
|         if( prev_intra_luma_pred_flag[x0 + i ][ y0 + j] ) | |
|           mpm_idx [ x0+i ][ y0 + j] | ae(v) |
|         else | |
|           rem_intra_luma_pred_mode [ x0+i ][ y0+j] | ae(v) |
|     intra_chroma_pred_mode [x0] [y0] | ae(v) |
| S2120     if(!sps_obip_flag ||(log2CbSize <= 4) ) | |
| S2130       obip_flag | ae(v) |
|     else | |
| ... | ... |

METHOD AND APPARATUS FOR ENCODING AND DECODING VIDEO SIGNAL USING INTRA PREDICTION FILTERING

CROSS-REFERENCE TO RELATED APPLICATIONS

This application is the National Stage filing under 35 U.S.C. 371 of International Application No. PCT/KR2016/009213 filed on Aug. 19, 2016, the contents of which are all hereby incorporated by reference herein in their entirety.

TECHNICAL FIELD

The present invention relates to a method and an apparatus for encoding/decoding a video signal, and more particularly, to a technique for eliminating discontinuity of a block boundary when a prediction mode of a current block is different from a prediction mode of a neighboring block.

BACKGROUND ART

Compression encoding means a series of signal processing technology for transmitting digitalized information through a communication line or for storing digitalized information in a form appropriate to a storage medium. Media such video, an image, and a voice may be a target of compression encoding, particularly, technology that performs compression encoding using video as a target is referred to as video compression.

Next generation video contents will have a characteristic of a high spatial resolution, a high frame rate, and high dimensionality of scene representation. In order to process such contents, memory storage, memory access rate, and processing power technologies will remarkably increase.

Therefore, there is a need to design a coding tool for processing next generation video contents more efficiently. In particular, an intra prediction generates a prediction block having various directions or no directionality with reference to an area adjacent to a current block. In this case, when a prediction mode of the current block differs from the prediction mode of a neighboring block, the difference value tends to increase in a boundary area of the prediction block, and as a result, it is necessary to improve a boundary area of a block in order to reduce an increased difference value.

DISCLOSURE

Technical Problem

An embodiment of the present invention provides a method for filtering a prediction block.

Furthermore, an embodiment of the present invention provides a method for improving a boundary area of the prediction block.

Furthermore, an embodiment of the present invention provides a method for filtering the prediction block by using a prediction mode of a current block and a prediction mode of a neighboring block.

Furthermore, an embodiment of the present invention provides a method for selecting the prediction mode of the neighboring block.

Furthermore, an embodiment of the present invention provides a method for deriving a reference sample in order to perform an enhanced prediction.

Furthermore, an embodiment of the present invention provides a method for performing filtering in order to perform the enhanced prediction.

Furthermore, an embodiment of the present invention provides a method for applying a weight at the time of generating the prediction block.

Technical Solution

In order to solve the technical problem,
the present invention provides a method for filtering a prediction block.

Furthermore, the present invention provides a method for eliminating discontinuity of a block boundary when a prediction mode of a current block is different from a prediction mode of a neighboring block.

Furthermore, the present invention provides a method for enhancing intra prediction performance by improving a boundary area of a prediction block.

Furthermore, the preset invention provides a method for selecting the prediction mode of a neighboring block for filtering a boundary area of a prediction block.

Furthermore, the preset invention provides a method for deriving a reference sample for filtering the boundary area of the prediction block.

Furthermore, the present invention provides a method for performing filtering in order to perform an enhanced prediction.

Furthermore, the present invention provides a method for applying a weight at the time of generating the prediction block.

Furthermore, the present invention provides a method for signaling whether to apply filtering to the boundary area of the prediction block.

Advantageous Effects

In an intra-prediction of a video codec, a prediction block with various directionalities or with no directionality is generated by referring to an area adjacent to a current block and an encoder/decoder performs encoding/decoding with respect to a difference value from a current block. In this case, when a prediction mode of the current block differs from the prediction mode of a neighboring block, the difference value tends to increase in a boundary area of the prediction block, and as a result, the present invention proposes a method for improving a boundary area of a block in order to reduce the difference value. Therefore, the difference value can be reduced, thereby enhancing intra-prediction performance of an image.

DESCRIPTION OF DRAWINGS

FIG. 1 is a block diagram illustrating a configuration of an encoder for encoding a video signal according to an embodiment of the present invention.

FIG. 2 is a block diagram illustrating a configuration of a decoder for decoding a video signal according to an embodiment of the present invention.

FIGS. 3A and 3B are diagrams illustrating a division structure of a coding unit according to an embodiment of the present invention.

FIG. 4 is an embodiment to which the present invention is applied and is a diagram for illustrating a prediction unit.

FIG. 5 is a diagram for describing an intra prediction method, as an embodiment to which the present invention is applied.

FIG. 6 is a diagram for describing a prediction direction according to an intra prediction mode, as an embodiment to which the present invention is applied.

FIG. 7 is a flowchart for describing a method for filtering a boundary of a prediction block based on prediction modes of a current block and a neighboring block, as another embodiment to which the present invention is applied.

FIG. 8 illustrates an area to which filtering is applicable according to block partitioning of the current block, as another embodiment to which the present invention is applied.

FIG. 9 is a flowchart for describing a method for applying filtering according to block partitioning of the current block, as another embodiment to which the present invention is applied.

FIG. 10 illustrates a boundary filtering area considering a block size and the prediction mode, as another embodiment to which the present invention is applied.

FIG. 11 illustrating that filtering is applied to a boundary area of a block by the unit of 4×4 blocks, as another embodiment to which the present invention is applied.

FIGS. 12 and 13 illustrate a reference sample to which the prediction modes of the current block and the neighboring block are to be applied according to a position of the neighboring block, as other embodiments to which the present invention is applied.

FIGS. 14 to 18 illustrate a reference sample which is available at the time of generating the prediction block by using the prediction block, as other embodiments to which the present invention is applied.

FIG. 19 illustrates a method for applying a weight according to a block size at the time of generating a prediction block of a block unit.

FIG. 20 illustrates a method for applying the weight according to a similarity of the prediction mode, as another embodiment to which the present invention is applied.

FIG. 21 illustrates a syntax for describing a method for signaling whether to apply filtering to the boundary area of the prediction block, as another embodiment to which the present invention is applied.

BEST MODE

The present invention provides a method for decoding a video signal, which includes: generating a first prediction block according to a prediction mode of a current block; checking the prediction mode of a neighboring block adjacent to the current block; generating a second prediction block based on the prediction mode of the neighboring block; generating a final prediction block by applying a weight to the first prediction block and the second prediction block; and reconstructing the video signal by using the final prediction block.

In the present invention, the checking further includes checking whether an upper neighboring block adjacent to an upper boundary of the current block and/or a left neighboring block adjacent to a left boundary is present, and checking whether the upper neighboring block and/or the left neighboring block is available.

In the present invention, whether the upper neighboring block and/or the left neighboring block is available is determined the prediction mode of the upper neighboring block and/or the left neighboring block is the same as the prediction mode of the current block.

In the present invention, when a plurality of neighboring blocks is present, the prediction mode of the neighboring block is set as one representative mode according to a specific criterion.

In the present invention, the specific criterion is determined based on at least one of a position of the neighboring block, a most probable prediction mode, an intermediate prediction mode, or a block size.

In the present invention, in the generating of the second prediction block, when a reference sample is not available, the second prediction block is generated by using the reference sample at another position.

In the present invention, the weight applied to the second prediction block has a larger weight value as being closer to a boundary of a block.

In the present invention, the weight is determined based on a similarity between the prediction mode of the current block and the prediction mode of the neighboring block.

In the present invention, when the similarity between the prediction mode of the current block and the prediction mode of the neighboring block is equal to or more than a specific value, the weight of the current block is set to be higher than the neighboring block, and when the similarity between the prediction mode of the current block and the prediction mode of the neighboring block is less than the specific value, the weight of the neighboring block is configured to be higher than the current block.

In the present invention, the method further includes: extracting a boundary filtering flag representing whether boundary filtering is performed at a specific level, and the checking is performed when the boundary filtering is performed at the specific level according to the boundary filtering flag.

The present invention provides an apparatus for decoding a video signal, which includes: an intra prediction unit generating a first prediction block according to a prediction mode of a current block, checking the prediction mode of a neighboring block adjacent to the current block, generating a second prediction block based on the prediction mode of the neighboring block, and generating a final prediction block by applying a weight to the first prediction block and the second prediction block; and a reconstructing unit reconstructing the video signal by using the final prediction block.

In the present invention, when the prediction mode of the neighboring block is the same as the prediction mode of the current block, the second prediction block is generated based on the prediction mode of the neighboring block.

In the present invention, when a plurality of neighboring blocks is present, the prediction mode of the neighboring block is set as one representative mode according to a specific criterion.

In the present invention, the weight is determined based on a similarity between the prediction mode of the current block and the prediction mode of the neighboring block.

In the present invention, the apparatus further includes a parsing unit extracting a boundary filtering flag representing whether boundary filtering is performed at a specific level.

MODE FOR INVENTION

Hereinafter, a configuration and operation of an embodiment of the present invention will be described in detail with reference to the accompanying drawings, a configuration and operation of the present invention described with reference to the drawings are described as an embodiment, and the scope, a core configuration, and operation of the present invention are not limited thereto.

Further, terms used in the present invention are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present invention and a meaning of the corresponding term should be comprehended and construed.

Further, when there is a general term selected for describing the invention or another term having a similar meaning, terms used in the present invention may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, a dequantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure, the present invention is not limited to the definitions of the terms. In this specification, for convenience of illustration, the term "coding unit" is employed as a unit used in a process of encoding or decoding a video signal, however, the present invention is not limited thereto, another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bitstreams.

The quantized signal output from the quantization unit 130 may be used to generate a prediction signal. For example, the quantized signal may be subjected to an inverse quantization and an inverse transform via the dequantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

On the other hand, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform prediction using an interpolated block composed of the interpolated pixels as a prediction block.

The intra-prediction unit 185 may predict the current block by referring to samples in the vicinity of a block which is to be subjected to current encoding. The intra-prediction unit 185 may perform the following process in order to perform the intra prediction. First, a reference sample may be prepared, which is required for generating the prediction signal. In addition, the prediction signal may be generated by using the prepared reference sample. Thereafter, the prediction mode is encoded. In this case, the reference sample may be prepared through reference sample padding and/or reference sample filtering. Since the reference sample is subjected to prediction and reconstruction processes, a quantization error may exist. Accordingly, a reference sample filtering process may be performed with respect to each prediction mode used for the intra prediction in order to reduce such an error.

The present invention provides a method for eliminating discontinuity of an intra block boundary when a prediction mode of a current block is different from a prediction mode of a neighboring block.

Furthermore, the preset invention provides a method for selecting the prediction mode of the neighboring block for filtering a boundary area of a prediction block and a method for deriving a reference sample.

Furthermore, the present invention provides a method for applying a weight at the time of generating the prediction block.

Furthermore, the present invention provides a method for signaling whether to apply filtering to the boundary area of the prediction block.

The prediction signal generated through the inter-prediction unit 180 or the intra-prediction unit 185 may be used for generating a reconstructed signal or used for generating a residual signal.

FIG. 2 shows a schematic block diagram of a decoder for decoding a video signal, in accordance with one embodiment of the present invention.

Referring to FIG. 2, a decoder 200 may include an entropy-decoding unit 210, a dequantization unit 220, an inverse transform unit 230, a filtering unit 240, a decoded picture buffer (DPB) 250, an inter-prediction unit 260 and an intra-prediction unit 265.

A reconstructed video signal output from the decoder 200 may be reproduced using a reproducing device.

The decoder 200 may receive the signal output from the encoder as shown in FIG. 1. The received signal may be entropy-decoded via the entropy-decoding unit 210.

The dequantization unit 220 may obtain a transform coefficient from the entropy-decoded signal using quantization step size information.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

FIGS. 3A and 3B are diagrams illustrating a division structure of a coding unit according to an embodiment of the present invention.

The encoder may split one video (or picture) in a coding tree unit (CTU) of a quadrangle form. The encoder sequentially encodes by one CTU in raster scan order.

For example, a size of the CTU may be determined to any one of 64×64, 32×32, and 16×16, but the present invention is not limited thereto. The encoder may select and use a size of the CTU according to a resolution of input image or a characteristic of input image. The CTU may include a coding tree block (CTB) of a luma component and a coding tree block (CTB) of two chroma components corresponding thereto.

One CTU may be decomposed in a quadtree (hereinafter, referred to as 'QT') structure. For example, one CTU may be split into four units in which a length of each side reduces in a half while having a square form. Decomposition of such a QT structure may be recursively performed.

Referring to FIG. 3A, a root node of the QT may be related to the CTU. The QT may be split until arriving at a leaf node, and in this case, the leaf node may be referred to as a coding unit (CU).

The CU may mean a basic unit of a processing process of input image, for example, coding in which intra/inter prediction is performed. The CU may include a coding block (CB) of a luma component and a CB of two chroma components corresponding thereto. For example, a size of the CU may be determined to any one of 64×64, 32×32, 16×16, and 8×8, but the present invention is not limited thereto, and when video is high resolution video, a size of the CU may further increase or may be various sizes.

Referring to FIG. 3A, the CTU corresponds to a root node and has a smallest depth (i.e., level 0) value. The CTU may not be split according to a characteristic of input image, and in this case, the CTU corresponds to a CU.

The CTU may be decomposed in a QT form and thus subordinate nodes having a depth of a level 1 may be generated. In a subordinate node having a depth of a level 1, a node (i.e., a leaf node) that is no longer split corresponds to the CU. For example, as shown in FIG. 3B, CU(a), CU(b), and CU(j) corresponding to nodes a, b, and j are split one time in the CTU and have a depth of a level 1.

At least one of nodes having a depth of a level 1 may be again split in a QT form. In a subordinate node having a depth of a level 2, a node (i.e., a leaf node) that is no longer split corresponds to a CU. For example, as shown in FIG. 3B, CU(c), CU(h), and CU(i) corresponding to nodes c, h, and l are split twice in the CTU and have a depth of a level 2.

Further, at least one of nodes having a depth of a level 2 may be again split in a QT form. In a subordinate node having a depth of a level 3, a node (i.e., a leaf node) that is no longer split corresponds to a CU. For example, as shown in FIG. 3B, CU(d), CU(e), CU(f), and CU(g) corresponding to d, e, f, and g are split three times in the CTU and have a depth of a level 3.

The encoder may determine a maximum size or a minimum size of the CU according to a characteristic (e.g., a resolution) of video or in consideration of encoding efficiency. Information thereof or information that can derive this may be included in bitstream. A CU having a maximum size may be referred to as a largest coding unit (LCU), and a CU having a minimum size may be referred to as a smallest coding unit (SCU).

Further, the CU having a tree structure may be hierarchically split with predetermined maximum depth information (or maximum level information). Each split CU may have depth information. Because depth information represents the split number and/or a level of the CU, the depth information may include information about a size of the CU.

Because the LCU is split in a QT form, when using a size of the LCU and maximum depth information, a size of the SCU may be obtained. Alternatively, in contrast, when using a size of the SCU and maximum depth information of a tree, a size of the LCU may be obtained.

For one CU, information representing whether a corresponding CU is split may be transferred to the decoder. For example, the information may be defined to a split flag and may be represented with "split_cu_flag". The split flag may be included in the entire CU, except for the SCU. For example, when a value of the split flag is '1', a corresponding CU is again split into four CUs, and when a value of the split flag is '0', a corresponding CU is no longer split and a coding process of the corresponding CU may be performed.

In an embodiment of FIGS. 3A and 3B, a split process of the CU is exemplified, but the above-described QT structure may be applied even to a split process of a transform unit (TU), which is a basic unit that performs transform.

The TU may be hierarchically split in a QT structure from a CU to code. For example, the CU may correspond to a root node of a tree of the transform unit (TU).

Because the TU is split in a QT structure, the TU split from the CU may be again split into a smaller subordinate TU. For example, a size of the TU may be determined to any one of 32×32, 16×16, 8×8, and 4×4, but the present invention is not limited thereto, and when the TU is high resolution video, a size of the TU may increase or may be various sizes.

For one TU, information representing whether a corresponding TU is split may be transferred to the decoder. For example, the information may be defined to a split transform flag and may be represented with a "split_transform_flag".

The split transform flag may be included in entire TUs, except for a TU of a minimum size. For example, when a value of the split transform flag is '1', a corresponding TU is again split into four TUs, and a value of the split transform flag is '0', a corresponding TU is no longer split.

As described above, the CU is a basic unit of coding that performs intra prediction or inter prediction. In order to more effectively code input image, the CU may be split into a prediction unit (PU).

A PU is a basic unit that generates a prediction block, and a prediction block may be differently generated in a PU unit even within one CU. The PU may be differently split according to whether an intra prediction mode is used or an inter prediction mode is used as a coding mode of the CU to which the PU belongs.

FIG. 4 is an embodiment to which the present invention is applied and is a diagram for illustrating a prediction unit.

A PU is differently partitioned depending on whether an intra-prediction mode or an inter-prediction mode is used as the coding mode of a CU to which the PU belongs.

FIG. 4(a) illustrates a PU in the case where the intra-prediction mode is used as the coding mode of a CU to which the PU belongs, and FIG. 4(b) illustrates a PU in the case where the inter-prediction mode is used as the coding mode of a CU to which the PU belongs.

Referring to FIG. 4(a), assuming the case where the size of one CU is 2N×2N (N=4, 8, 16 or 32), one CU may be partitioned into two types (i.e., 2N×2N and N×N).

In this case, if one CU is partitioned as a PU of the 2N×2N form, this means that only one PU is present within one CU.

In contrast, if one CU is partitioned as a PU of the N×N form, one CU is partitioned into four PUs and a different prediction block for each PU is generated. In this case, the partition of the PU may be performed only if the size of a CB for the luma component of a CU is a minimum size (i.e., if the CU is an SCU).

Referring to FIG. 4(b), assuming that the size of one CU is 2N×2N (N=4, 8, 16 or 32), one CU may be partitioned into eight PU types (i.e., 2N×2N, N×N, 2N×N, N×2N, nL×2N, nR×2N, 2N×nU and 2N×nD).

As in intra-prediction, the PU partition of the N×N form may be performed only if the size of a CB for the luma component of a CU is a minimum size (i.e., if the CU is an SCU).

In inter-prediction, the PU partition of the 2N×N form in which a PU is partitioned in a traverse direction and the PU partition of the N×2N form in which a PU is partitioned in a longitudinal direction are supported.

Furthermore, the PU partition of nL×2N, nR×2N, 2N×nU and 2N×nD forms, that is, asymmetric motion partition (AMP) forms, are supported. In this case, 'n' means a ¼ value of 2N. However, the AMP cannot be used if a CU to which a PU belongs is a CU of a minimum size.

In order to efficiently code an input image within one CTU, an optimum partition structure of a coding unit (CU), a prediction unit (PU) and a transform unit (TU) may be determined based on a minimum rate-distortion value through the following execution process. For example, an optimum CU partition process within a 64×64 CTU is described. A rate-distortion cost may be calculated through a partition process from a CU of a 64×64 size to a CU of an 8×8 size, and a detailed process thereof is as follows.

1) A partition structure of an optimum PU and TU which gene rates a minimum rate-distortion value is determined by performing inter/intra-prediction, transform/quantization and inverse quantization/inverse transform and entropy encoding on a CU of a 64×64 size.

2) The 64×64 CU is partitioned into four CUs of a 32×32 size, and an optimum partition structure of a PU and a TU which generates a minimum rate-distortion value for each of the 32×32 CUs is determined.

3) The 32×32 CU is partitioned into four CUs of a 16×16 size again, and an optimum partition structure of a PU and a TU which generates a minimum rate-distortion value for each of the 16×16 CUs is determined.

4) The 16×16 CU is partitioned into four CUs of an 8×8 size again, and an optimum partition structure of a PU and a TU which generates a minimum rate-distortion value for each of the 8×8 CUs is determined.

5) An optimum partition structure of a CU within a 16×16 block is determined by comparing the rate-distortion value of a 16×16 CU calculated in the process 3) with the sum of the rate-distortion values of the four 8×8 CUs calculated in the process 4). This process is performed on the remaining three 16×16 CUs in the same manner.

6) An optimum partition structure of a CU within a 32×32 block is determined by comparing the rate-distortion value of a 32×32 CU calculated in the process 2) with the sum of the rate-distortion values of the four 16×16 CUs calculated in the process 5). This process is performed on the remaining three 32×32 CUs in the same manner.

7) Finally, an optimum partition structure of a CU within a 64×64 block is determined by comparing the rate-distortion value of the 64×64 CU calculated in the process 1) with the sum of the rate-distortion values of the four 32×32 CUs obtained in the process 6).

In the intra-prediction mode, a prediction mode is selected in a PU unit and prediction and a reconfiguration are performed in an actual TU unit with respect to the selected prediction mode.

The TU means a basic unit by which actual prediction and a reconfiguration are performed. The TU includes a transform block (TB) for a luma component and a TB for two chroma components corresponding to the TB for a luma component.

In the example of FIG. 3, as in the case where one CTU is partitioned as a quadtree structure to generate a CU, a TU is hierarchically partitioned as a quadtree structure from one CU to be coded.

The TU is partitioned as a quadtree structure, and thus a TU partitioned from a CU may be partitioned into smaller lower TUs. In HEVC, the size of the TU may be determined to be any one of 32×32, 16×16, 8×8 and 4×4.

Referring back to FIG. 3, it is assumed that the root node of a quadtree is related to a CU. The quadtree is partitioned until a leaf node is reached, and the leaf node corresponds to a TU.

More specifically, a CU corresponds to a root node and has the smallest depth (i.e., depth=0) value. The CU may not be partitioned depending on the characteristics of an input image. In this case, a CU corresponds to a TU.

The CU may be partitioned in a quadtree form. As a result, lower nodes of a depth 1 (depth=1) are generated. Furthermore, a node (i.e., leaf node) that belongs to the lower nodes having the depth of 1 and that is no longer partitioned corresponds to a TU. For example, in FIG. 3(b), a TU(a), a TU(b) and a TU(j) corresponding to nodes a, b and j, respectively, have been once partitioned from the CU, and have the depth of 1.

At least any one of the nodes having the depth of 1 may be partitioned in a quadtree form again. As a result, lower nodes having a depth 2 (i.e., depth=2) are generated. Furthermore, a node (i.e., leaf node) that belongs to the lower nodes having the depth of 2 and that is no longer partitioned corresponds to a TU. For example, in FIG. 3(b), a TU(c), a TU(h) and a TU(i) corresponding to nodes c, h and i, respectively, have been twice partitioned from the CU, and have the depth of 2.

Furthermore, at least any one of the nodes having the depth of 2 may be partitioned in a quadtree form again. As a result, lower nodes having a depth 3 (i.e., depth=3) are generated. Furthermore, a node (i.e., leaf node) that belongs to the lower nodes having the depth of 3 and that is no longer partitioned corresponds to a CU. For example, in FIG. 3(b), a TU(d), a TU(e), a TU(f) and a TU(g) corresponding to nodes d, e, f and g, respectively, have been partitioned three times from the CU, and have the depth of 3.

A TU having a tree structure has predetermined maximum depth information (or the greatest level information) and may be hierarchically partitioned. Furthermore, each partitioned TU may have depth information. The depth information may include information about the size of the TU because it indicates the partitioned number and/or degree of the TU.

Regarding one TU, information (e.g., a partition TU flag "split_transform_flag") indicating whether a corresponding TU is partitioned may be transferred to the decoder. The partition information is included in all of TUs other than a TU of a minimum size. For example, if a value of the flag indicating whether a corresponding TU is partitioned is "1", the corresponding TU is partitioned into four TUs again. If a value of the flag indicating whether a corresponding TU is partitioned is "0", the corresponding TU is no longer partitioned.

FIGS. 5 and 6 are embodiments to which the present invention is applied. FIG. 5 is a diagram for illustrating an intra-prediction method and FIG. 6 is a diagram for illustrating a prediction direction according to an intra-prediction mode.

Referring to FIG. 5, the decoder may derive the intra-prediction mode of a current processing block (S501).

In intra-prediction, a prediction direction for the location of a reference sample used for prediction may be included depending on a prediction mode. In this specification, an intra-prediction mode having a prediction direction is called an intra-direction prediction mode "Intra_Angular prediction mode" or an intra-direction mode. In contrast, an intra-prediction mode not having a prediction direction includes intra planar (INTRA_PLANAR) prediction mode and an intra DC (INTRA_DC) prediction mode.

Table 1 illustrates names associated with the intra-prediction modes, and FIG. 6 illustrates prediction directions according to the intra-prediction modes.

TABLE 1

| intra-prediction mode | Associated name |
| --- | --- |
| 0 | INTRA_PLANAR |
| 1 | INTRA_DC |

TABLE 1-continued

| intra-prediction mode | Associated name |
| --- | --- |
| 2 ... 34 | Intra-direction (INTRA_ANGULAR2 ... INTRA_ANGULAR34) |

In intra-prediction, prediction for a current processing block is performed based on a derived prediction mode. The reference sample and detailed prediction method used for prediction are different depending on the prediction mode. If a current block is encoded in the intra-prediction mode, the decoder may derive the prediction mode of the current block in order to perform prediction.

The decoder may check whether neighboring samples of the current processing block can be used for prediction and obtain Reference sample to be used for the prediction (S502).

In intra-prediction, neighboring samples of a current processing block mean a sample that neighbors the left boundary of the current processing block of an nS×nS size, a total of 2×nS samples that neighbor the bottom left, a sample that neighbors the top boundary of the current processing block, a total of 2×nS samples that neighbor the top right, and a sample that neighbors the top left of the current processing block.

However, some of the neighboring samples of the current processing block may have not been decoded or may not be available. In this case, the decoder may configure the reference samples to be used for prediction by substituting unavailable samples with available samples.

The decoder may filter the reference sample depending on an intra-prediction mode (S503).

Whether the filtering is to be performed on the reference sample may be determined based on the size of the current processing block. Furthermore, a method of filtering the reference sample may be determined by a filtering flag transferred by an encoder.

The decoder may generate a prediction block for the current processing block based on the intra-prediction mode and the reference samples (S504). That is, the decoder may generate the prediction block (i.e., generate the prediction sample) for the current processing block based on the intra-prediction mode derived in the intra-prediction mode derivation step S501 and the reference samples obtained through the reference sample configuration step S502 and the reference sample filtering step S503.

If the current processing block is encoded in the INTRA_DC mode, in order to minimize the discontinuity of the boundary between processing blocks, at step S504, the left boundary sample (i.e., a sample neighboring a left boundary within the prediction block) and top boundary sample (i.e., a sample neighboring a top boundary within the prediction block) of the prediction block may be filtered.

Furthermore, at step S504, filtering may be applied to the left boundary sample or the top boundary sample as in the INTRA_DC mode with respect to the vertical mode and horizontal mode of the intra-direction prediction modes.

More specifically, if the current processing block has been encoded in the vertical mode or horizontal mode, the value of a prediction sample may be derived based on a reference sample located in a prediction direction. In this case, a boundary sample that belongs to the left boundary sample or top boundary sample of the prediction block and that is not located in the prediction direction may neighbor a reference sample not used for prediction. That is, the distance from the reference sample not used for the prediction may be much shorter than the distance from a reference sample used for the prediction.

Accordingly, the decoder may adaptively apply filtering to left boundary samples or top boundary samples depending on whether an intra-prediction direction is the vertical direction or horizontal direction. That is, if the intra-prediction direction is the vertical direction, filtering may be applied to the left boundary samples. If the intra-prediction direction is the horizontal direction, filtering may be applied to the top boundary samples.

FIG. 7 is a flowchart for describing a method for filtering a boundary of a prediction block based on prediction modes of a current block and a neighboring block, as another embodiment to which the present invention is applied.

The present invention provides a method for eliminating discontinuity of an intra block boundary when a prediction mode of a current block is different from a prediction mode of a neighboring block.

First, the encoder may determine the prediction mode of the current block (S710) and check whether the prediction mode of the current block is the intra prediction mode (S720).

When the prediction mode of the current block indicates the intra prediction mode according to a result of the checking, the encoder may generate a prediction value of the current block according to the intra prediction mode of the current block (S730).

In addition, the encoder may confirm the intra prediction mode of a neighboring block neighboring to the current block (S740) and generate the prediction value of the neighboring block according to the intra prediction mode of the neighboring block (S750).

The encoder may perform filtering by applying a weight to the prediction value of the current block and the prediction value of the neighboring block (S760).

The encoder may acquire the filtered final prediction value (S770).

Meanwhile, when the prediction mode of the current block is not the intra prediction mode according to a result of the confirming, the encoder may perform an inter prediction (S780).

FIG. 8 illustrates an area to which filtering is applicable according to block partitioning of the current block, as another embodiment to which the present invention is applied.

The present invention provides various embodiments for a method for selecting an area of a block to be filtered.

As a first example, filtering may be performed with respect to a left boundary and an upper boundary of a target block. For example, FIG. 8(a) illustrates a left/upper boundary of a coding unit or 2N×2N prediction unit. In the case of the intra prediction mode, since the prediction block is generated with a surrounding reconstructed pixel value, in FIG. 8(a), the prediction block of the neighboring block is the intra prediction mode and the intra prediction mode of the current block may be more efficient in another case.

As a second example, filtering may be performed with respect to the left boundary and the upper boundary of the prediction unit. For example, FIG. 8(a) illustrates the left/upper boundary of a coding unit or an N×N prediction unit. When the current block is partitioned into a plurality of prediction units, the filtering is performed with respect to the left boundary and the upper boundary of each prediction unit, thereby enhancing prediction performance. In FIG. 8(b) above, the N×N prediction unit is taken as an example, but the present invention is not limited thereto and may be similarly applied even to a prediction unit with a different size.

As a third example, the filtering may be performed with respect to a part of the left boundary and the upper boundary of the coding unit or the prediction unit. For example, FIG. 8(c) illustrates the left boundary of the coding unit. When the current block is partitioned into the plurality of prediction units, the filtering is performed with respect to the left boundary and the upper boundary of each prediction unit, thereby enhancing the prediction performance. In FIG. 8(c) above, the left boundary of the coding unit or the prediction unit is taken as an example, but the present invention is not limited thereto and may be similarly applied even to a part of the left boundary, a part of the upper boundary, or a part of both boundaries.

In the case of the intra prediction mode, when the prediction mode of the current block and the prediction mode (here, the neighboring block may be CU or PU) of the neighboring block are different from each other, a difference value intends increase due to discontinuity of adjacent boundary areas. In order to reduce the difference value, a boundary portion of the prediction block for the current block may be filtered by using the prediction mode of the current block and the prediction block of the neighboring block.

As another example, when the prediction mode of the neighboring block is an inter mode, a first prediction block may be generated by using motion information of the neighboring block and the weight may be applied to a second prediction block generated according to the intra prediction mode of the current block and the first prediction block. The weights are applied to the first prediction block and the second prediction block and added to acquire the final prediction block for the current block.

As another example, when the prediction mode of the neighboring block is the inter mode, the neighboring block may not apply a weighted sum.

FIG. 9 is a flowchart for describing a method for applying filtering according to block partitioning of the current block, as another embodiment to which the present invention is applied.

The present invention provides various embodiments for a boundary filtering area applied according to a predetermined filtering condition.

For example, the boundary filtering area may be determined according to the following criteria.

(i) The filtering may be applied to the block boundary portion of the CU or PU.

(ii) The filtering may be applied to a partial area of the block boundary portion of the CU or PU.

(ii) The filtering may be applied to a left area and an upper area of the block boundary portion of the CU or PU.

(iv) The filtering may be applied to the boundary area to which the filtering is applied may be applied by the unit of a sub-block, a line, or a pixel.

(v) The filtering may be differently applied to a boundary portion of the CU and the boundary portion of a PU other than the boundary portion of the CU.

(vi) The filtering area may depend on a size of the current block and/or the neighboring block.

(vii) The filtering area may depend on the prediction mode of the current block and/or the neighboring block.

For example, the filtering may be applied when the prediction mode of the current block is an intra-directional mode.

Alternatively, when the prediction mode of the current block and the prediction mode of the neighboring block are the same, the filtering may not be applied.

Alternatively, even when the prediction mode of the current block and the prediction mode of the neighboring block are the same, the filtering of a reference sample may be applied differently.

Alternatively, the filtering area may be changed based on a similarity of a prediction direction according to the prediction modes of the current block and the neighboring block. For example, the higher the similarity of the prediction direction, the higher the similarity of a reference area, and thus the filtering area may be widened.

(viii) The embodiments may be combined and according to the present invention, the filtering area may be determined based on at least one of the embodiments.

FIG. 9 above illustrates an embodiment for a method for performing a prediction by a decoder according to the embodiments.

First, the decoder may generate a first prediction block Pc according to the prediction mode of the current block (S910).

The decoder may verify a CU size of the current block (S920). As a result of the verification in step S920, when the CU size is larger than a predetermined size, the decoder may perform the prediction by applying the weighted sum based on the prediction modes of the current block and the neighboring block.

For example, when the CU size is larger than 16, the decoder may verify the prediction mode of the neighboring block (S930). In this case, the decoder may repeatedly perform verification with respect to the sub-blocks of the neighboring block. Here, an identifier of the sub-block may be expressed as block_id and performed from block_id=0.

More specifically, the decoder may first check whether the neighboring block adjacent to the current block exists. For example, neighboring blocks adjacent to the upper and left boundaries of the current block may be verified. When a block adjacent to the upper boundary and a block adjacent to the left boundary are available, in an upper left boundary area of the current block, both an upper neighboring block and a left neighboring block are available.

The decoder checks whether the prediction mode of the neighboring block is the same as the prediction mode of the current block to check whether the neighboring block is available.

In addition, the decoder may verify the prediction mode of the available neighboring block. In this case, the prediction mode of the neighboring block may be set as a representative mode. This will be described in more detail in another embodiment in the specification.

Meanwhile, in the verification result in step S920 above, when the CU size is not larger than the predetermined size, the decoder may determine whether to perform boundary filtering based on a boundary filtering flag (S980). Here, the boundary filtering flag indicates whether to perform the boundary filtering for the current block. For example, the boundary filtering flag may be expressed as obip_flag and the boundary filtering flag may be separately defined at each level, such as a sequence parameter set, CU, or the like. When obip_flag==True as described above, the decoder may perform the boundary filtering. On the contrary, when obip_flag==false as described above, the decoder may not perform the boundary filtering.

After step S930, the decoder may check whether the prediction mode of the neighboring block is the intra-directional mode (S940). As the checking result in step S940, when the prediction mode of the neighboring block indicates the intra-directional mode, it may be check whether the prediction mode of the current block and the prediction mode of the neighboring block are the same as each other (step S950).

Meanwhile, as the checking result in step S940, when the prediction mode of the neighboring block does not indicate the intra-directional mode, the decoder may perform steps S930 and S940 with respect to a subsequent sub-block.

In addition, as the checking result in step S950, when the prediction mode of the current block and the prediction mode of the neighboring block are not the same as each other, the decoder may generate a second prediction block Px according to the prediction mode of the neighboring block (S960). More specifically, the decoder may first derive THE reference sample and perform the filtering with respect to the reference samples. In addition, the decoder may generate the second prediction block by using the filter ed reference sample.

Meanwhile, as the checking result in step S950, when the prediction mode of the current block and the prediction mode of the neighboring block are the same as each other, the decoder may perform steps S930 to S950 with respect to the subsequent sub-block.

Last, the decoder may generate a final prediction block by applying the weight to the first prediction block Pc and the second prediction block Px (S970).

FIG. 10 illustrates a boundary filtering area considering a block size and the prediction mode, as another embodiment to which the present invention is applied.

FIG. 10(*a*) illustrates a boundary filtering area considering the prediction mode when the size of the current block is 32×32 and FIG. 10(*b*) illustrates a boundary filtering area considering the prediction mode when the size of the current block is 16×16.

According to the present invention, the boundary filtering area may be determined based on at least one of the block size and the intra prediction mode.

Referring to FIG. 10(*a*), it may be verified that the size of the current block is 32×32 and the intra prediction mode of the current block is 23.

First, the encoder/decoder may check whether the size of the current block is larger than a predetermined size (e.g., 16×16). When the size of the current block is larger than the predetermined size, the filtering may be performed according to a predetermined filtering condition. Here, the embodiments described in FIG. 9 may be applied to the predetermined filtering condition.

For example, in the case of FIG. 10(*a*), when the size of the current block is larger than 16, the filtering may be performed with respect to the left and upper boundary areas of the current prediction block and in this case, the filtering may be performed by the unit of 4×4 blocks. However, the present invention is not limited thereto and the filtering may be performed by the unit of the block, the line, or the pixel with a different size.

In addition, the encoder/decoder may check whether the intra prediction mode of the neighboring block is the intra directional mode. When the prediction mode of the neighboring block indicates the intra directional mode, it may be check whether the intra prediction mode of the current block and the intra prediction mode of the neighboring block are the same as each other.

When the intra prediction mode of the current block is not the same as the intra prediction mode of the neighboring block, the weighted sum is applied to a first prediction block Pc according to the intra prediction mode of the current block and a second prediction block Px according to the intra prediction mode of the neighboring block to generate the final prediction block.

For example, in the case of FIG. 10(a), the intra prediction mode of the neighboring block is 20, 28, 26, 34, and 23 which indicate the intra directional mode and all intra prediction modes other than neighboring block A have different intra prediction mode values. Therefore, in regard to the boundary filtering area, the remaining areas other than the boundary area adjacent to the neighboring block A may be determined as the boundary filtering area.

In addition, the weighted sum is applied to a first prediction value according to an intra prediction mode 23 of the current block and second prediction values according to intra prediction modes 34, 26, 28, and 20 of the remaining neighboring blocks B, C, D, and E to generate a final prediction value.

As another example, referring to FIG. 10(b), it may be verified that the size of the current block is 16×16 and the intra prediction mode of the current block is 23.

Referring to FIG. 10(b), when the size of the current block is not larger than 16, the filtering may be performed with respect to a part of the left and upper boundary areas of the current prediction block and for example, the filtering may be performed by the unit of 2×4 blocks or 4×2. However, the present invention is not limited thereto and the filtering may be performed by the unit of the block, the line, or the pixel with a different size. In this case, in regard to the filtering, it may be determined whether the boundary filtering is to be performed based on the boundary filtering flag.

In addition, the intra prediction modes of the neighboring block are 23, 26, and 34 which all indicate intra directional modes and have different infra prediction mode values except for a neighboring block N. Therefore, in regard to the boundary filtering area, the remaining areas other than the boundary area adjacent to the neighboring block A may be determined as the boundary filtering area.

In addition, the weighted sum is applied to a first prediction value according to an intra prediction mode 23 of the current block and second prediction values according to intra prediction modes 34 and 26 of the remaining neighboring blocks L and M to generate the final prediction value.

Meanwhile, in the case of a color difference signal, the filtering may be performed for an area smaller than the boundary filtering area of a luminance signal. For example, in the case of the luminance signal, the filtering may be performed by the unit of 4×4 blocks and in the case of the color difference signal, the filtering may be performed by the unit of 4×2 or 2×4 blocks.

FIG. 11 illustrating that filtering is applied to a boundary area of a block by the unit of 4×4 blocks, as another embodiment to which the present invention is applied.

A method for generating the final prediction block by filtering the boundary area of the current prediction block is shown in Equation 1 below.

$$P_{Final}(i,j)=w \cdot P_C(i,j)+(1-w) \cdot P_X(i,j) \quad \text{[Equation 1]}$$

Here, (i,j) represents a position of the filtering boundary area in the block. For example, when the filtering is applied by the unit of 4×4 blocks, i,j has a value of 0 . . . 3.

In Equation 1 above, $P_C$ represents a first prediction value according to the intra prediction mode of the current block and $P_X$ represents a second prediction value according to the intra prediction mode of the neighboring block. w represents the weight and x represents the position of the neighboring block. For example, in the case of FIG. 11, x may represent an upper side A and a left side L.

The present invention proposes a method for selecting the prediction mode of the neighboring block for filtering the boundary area of the current prediction block and a method for generating the prediction block $P_X$ according to the intra prediction mode of the neighboring block.

An embodiment of the present invention provides a method for determining or selecting the prediction mode of the neighboring block.

Referring to FIG. 11, in the present invention, the filtering may be applied to the left and upper boundaries of the current prediction block by the unit of 4×4 blocks.

For example, when the prediction mode of the current block is represented by ModeC and the prediction modes of the upper neighboring block are represented by ModeA1, ModeA2, and ModeA3, respectively, prediction blocks $P_C$, $P_{A1}$, $P_{A2}$, and $P_{A3}$ generated by using the same are applied to Equation 1 above to generate the final prediction block.

When each 4×4 block in the current block is adjacent to the upper side, a prediction block may be generated using the prediction mode of the upper neighboring block and when each 4×4 block is adjacent to the left side, the prediction block may be generated by using the prediction mode of the left neighboring block. Further, when each 4×4 block is adjacent to both the left side and the upper side, the prediction block may be generated by using the prediction modes of both neighboring blocks. Embodiments shown in Equation 2 to 6 below may be used for a method of using the prediction blocks of both neighboring blocks.

$$P_{Final}(i,j)=w \cdot P_C(i,j)+((1-w) \cdot P_A(i,j)+(1-w) \cdot P_L(i,j))/2 \quad \text{[Equation 2]}$$

$$P_{Final}(i,j)=w \cdot (w \cdot P_C(i,j)+(1-w) \cdot P_A(i,j))+(1-w) \cdot P_L(i,j) \quad \text{[Equation 3]}$$

$$P_{Final}(i,j)=w_2 \cdot (w_1 \cdot P_C(i,j)+(1-w_1) \cdot P_A(i,j))+(1-w_2) \cdot P_L(i,j) \quad \text{[Equation 4]}$$

$$P_{Final}(i,j)=w \cdot (w \cdot P_C(i,j)+(1-w) \cdot P_L(i,j))+(1-w) \cdot P_A(i,j) \quad \text{[Equation 5]}$$

$$P_{Final}(i,j)=w_2 \cdot (w_1 \cdot P_C(i,j)+(1-w_1) \cdot P_L(i,j))+(1-w_2) \cdot P_A(i,j) \quad \text{[Equation 6]}$$

In the case of Equation 2, an average value of the prediction value of a left neighboring block and the prediction value of a right neighboring block is used.

In the case of Equation 3, first, the weight is applied to the prediction value of the current block and the prediction value of the upper neighboring block and then, the weight is applied to a result value thereof and the prediction value of the left neighboring block.

In Equation 4, the method of Equation 3 above is used, and a first weight and a second weight have different values.

In the case of Equation 5 above, first, the weight is applied to the prediction value of the current block and the prediction value of the left neighboring block and then, the weight is applied to a result value thereof and the prediction value of the upper neighboring block.

In Equation 6 above, the method of Equation 5 above is used, and the first weight and the second weight have different values.

The methods are just embodiments and the present invention is not limited thereto. Further, the methods may be combined with each other and may be applied under a predetermined condition.

According to another embodiment of the present invention, when at least one neighboring block in each direction adjacent to the current block exists, the representative mode may be determined and the prediction value may be generated according to the representative mode.

Since the prediction mode of the neighboring block may be changed by the unit of 4×4 blocks, a prediction value for smoothing the filtering boundary area of the current block may also be changed by the unit of 4×4 blocks. In order to simplify a process of generating the prediction block, a mode comparison by the unit of a current PU block may also be available rather than a mode comparison by the unit of 4×4 blocks. To this end, the representative modes of neighboring blocks A and L may be determined. Embodiments of a method for determining the representative mode are as follows.

(i) The mode of the neighboring block located at an upper right side A3 of the current block may be determined as the representative mode.

(ii) A mode of the neighboring block located at an upper left side A1 of the current block may be determined as the representative mode.

(iii) The mode of the neighboring block located at a lower left side L2 of the current block may be determined as the representative mode.

(iv) The mode of the neighboring block located at an upper left side L1 of the current block may be determined as the representative mode.

(v) A most probable mode of all 4×4 blocks existing on the upper side of the current block may be determined as the representative mode. For example, when the most probable mode is determined, a representative section of the prediction modes may be predetermined and a mode included in the representative section may be determined as the representative mode.

(vi) The most probable mode of all 4×4 blocks existing on the left side of the current block may be determined as the representative mode. For example, when the most probable mode is determined, the representative section of the prediction modes may be predetermined and the mode included in the representative section may be determined as the representative mode.

(vii) A median mode among all 4×4 blocks existing on the upper side of the current block may be determined as the representative mode. For example, when the median mode is determined, the representative section of the prediction modes may be predetermined and the mode included in the representative section may be determined as the representative mode. Alternatively, a mode having a median value among all modes may be determined as the representative mode.

(viii) A median mode among all 4×4 blocks existing on the left side of the current block may be determined as the representative mode. For example, when the median mode is determined, the representative section of the prediction modes may be predetermined and the mode included in the representative section may be determined as the representative mode. Alternatively, a mode having a median value among all modes may be determined as the representative mode.

(ix) Among the above methods, it is also possible to determine the corresponding mode as one representative mode representing all neighboring blocks that are not the representative mode of the neighboring block A or L.

The methods are just embodiments and the present invention is not limited thereto. Further, the methods may be combined with each other and may be applied under a predetermined condition.

FIGS. 12 and 13 illustrate a reference sample to which the prediction modes of the current block and the neighboring block are to be applied according to a position of the neighboring block, other embodiments to which the present invention is applied.

The present invention provides a method for deriving the reference sample to be used according to the prediction mode of the current block and the prediction mode of the neighboring block.

FIG. 12 illustrates a case of using the same reference sample as the current block and FIG. 13 illustrates a case of using a different reference sample from the current block.

Similar to the case of generating the reference block using the prediction mode of the current block, the reference sample adjacent to the block is used when the reference block is generated using the prediction mode of the neighboring block.

Referring to FIG. 12, a current block C generates a first prediction block Pc using a reference sample Rc according to Mode C and generates a second prediction block $P_A$ using a reference sample $R_A$ according to a prediction mode ModeA of a neighboring block A1.

Therefore, in the case of the A1 block located on the upper left side of the current block, the same reference sample as that of the current block is used, and as a result, the A1 block may be applied similarly to the existing method.

However, referring to FIG. 13, the current block C generates the first prediction block Pc using the reference sample Rc according to Mode C and generates the second prediction block $P_A$ using the reference sample $R_A$ according to the prediction mode ModeA of the neighboring block A1. Here, referring to the reference sample $R_A$, since upper reference samples are used or left reference samples or the current block is not yet reconstructed, the reference samples are not unavailable.

As described above, in the case of a prediction mode in which the left reference sample needs to be used, the reference sample cannot but be used limitatively. Therefore, hereinafter, when the reference sample is unavailable, methods for replacing or deriving the reference sample with other samples will be described.

FIGS. 14 to 18 illustrate a reference sample which is available at the time of generating the prediction block by using the prediction block, as other embodiments to which the present invention is applied.

FIG. 14 illustrates a case of replacing the reference sample with a left sample of the current block, FIG. 15 illustrates a method for replacing the reference sample with the upper sample of the current block, FIG. 16 illustrates a method for replacing the reference sample with the reference sample of the neighboring block, FIG. 17 illustrates a method for replacing the reference sample with the reference sample used at the time of generating the prediction block of the neighboring block, and FIG. 18 illustrates a method for replacing a partial area of the neighboring block with the reference sample.

According to the present invention, the reference sample may be derived by using the following methods at the time of generating the prediction block by using the prediction mode of the neighboring block.

(i) Referring to FIG. 14, when the prediction mode of the upper neighboring block is used and the left reference sample is unavailable, the left reference sample which is unavailable may be replaced with the left reference sample $R_A$ of the current block. Alternatively, when the prediction mode of the left neighboring block is used and the upper reference sample is unavailable, the upper reference sample which is unavailable may be replaced with the upper reference sample of the current block.

(ii) Referring to FIG. 15, when the prediction mode of the upper neighboring block is used and the left reference sample is unavailable, the left reference sample which is unavailable may be replaced with the left reference sample $R_A$ of the current block. Here, the upper reference sample of the current block may mean the upper reference sample of the current block existing on the left side of the neighboring block A2 as illustrated in FIG. 15.

Alternatively, when the prediction mode of the left neighboring block is used and the upper reference sample is unavailable, the upper reference sample which is unavailable may be replaced with the left reference sample of the current block. Here, the left reference sample of the current block may mean the left reference sample of the current block existing on the upper side of the neighboring block.

(iii) Referring to FIG. 16, when the prediction mode of the up per neighboring block is used and the left reference sample is unavailable, the left reference sample which is unavailable may be replaced with the left reference sample $R_A$ used at the time of generating the prediction block of the neighboring block.

Alternatively, when the prediction mode of the left neighboring block is used and the upper reference sample is unavailable, the upper reference sample which is unavailable may be replaced with the upper reference sample used at the time of generating the prediction block of the neighboring block.

(iv) Referring to FIG. 17, when the prediction mode of the upper neighboring block is used and the left reference sample is unavailable, the upper left reference sample $R_A$ of the neighboring block used at the time of generating the prediction block of the neighboring block may be used.

(v) Referring to FIG. 18, when the prediction mode of the upper neighboring block is used and the left reference sample is unavailable, a partial area of the neighboring block may be used as the reference sample. The method may be applied by considering a line buffer issue. For example, when attempting to limit a memory access to reduce cost in hardware design, an access of the upper neighboring block may be restricted. Therefore, a maximum access area of the upper neighboring block may be restricted to 4 lines and an access area of the left neighboring block may not be restricted.

(vi) when the prediction mode of the upper/left neighboring block is used and the left/upper reference sample is unavailable, a prediction mode having a sample which is available at the upper and left sides and a reference sample corresponding thereto may be used.

(vii) When the prediction mode of the upper/left neighboring block is used and the left/upper reference sample is unavailable, the reference sample of the current block may be used as it is.

(viii) In the case of the prediction mode having the unavailable reference sample, only the first prediction block depending on the prediction mode of the current block may be used without generating the second prediction block Px.

Another embodiment of the present invention provides a method for performing the boundary filtering after deriving the reference sample based on such embodiments.

For example, when generating the first prediction block $P_C$ and the second prediction block $P_X$, the following embodiments may be applied.

(i) After smoothing a [1,2,1] filter for the reference samples, the prediction block may be generated according to the prediction mode.

(ii) The prediction block may be generated according to the prediction mode using the reconstructed reference sample.

(iii) A sharpening filter may be applied to the reconstructed reference sample such that an edge of the corresponding area is prominent and then the prediction block may be generated according to the prediction mode.

(iii) A new sharpening filter may be applied such that the corresponding area is blurred to the reconstructed reference sample and then the prediction block may be generated according to the prediction mode. The smoothing filter may be defined by increasing the number of taps of the existing filter or adjusting a coefficient value.

(v) When the prediction modes of the neighboring blocks are different, the smoothing filter may be additionally applied to the block boundary portion of the reconstructed reference sample or a strong smoothing filter may be applied to the corresponding area and then, the prediction block may be generated according to the prediction mode. For example, when the prediction block is generated using the prediction mode of the neighboring block by the unit of 4×4 blocks, a boundary between the prediction blocks may be generated for each 4×4 block, and as a result, such a method may be applied as a method for eliminating the boundary.

(vi) The first prediction block Pc and the second prediction block $P_X$ may be generated by combining one or more of the embodiments and methods for generating the reference samples of the first prediction block $P_C$ and the second prediction block Px may be the same or different. Further, different methods may be applied based on at least one of the position of the reference sample, the block size, and the prediction mode.

FIG. 19 illustrates a method for applying a weight according to a block size at the time of generating a prediction block of a block unit, as another embodiment to which the present invention is applied.

FIG. 19(*a*) illustrates an embodiment in which different weights are applied according to pixel positions in units of 4×4 blocks and FIG. 19(*b*) illustrates an embodiment in which different weights are applied according to pixel positions in units of 4×2 and 2×4 blocks.

When the first prediction block Pc and the second prediction block $P_X$ are generated based on the embodiments described above, the final prediction block may be generated by applying the weight by using one of Equations 1 to 6 above by using the generated first and second prediction blocks.

The present invention proposes a method for applying the weight.

Referring to FIG. 19(*a*), in the 4×4 block unit, the second prediction block generated according to the prediction mode of the left neighboring block may be referred to as $Pred_L$ and the first prediction block generated according to the prediction mode of the current block may be referred as $Pred_C$.

In an embodiment of the present invention, the weight may be set so that the weight of the second prediction block $Pred_L$ tends to increase as being closer to the boundary of the block. For example, the weight of the second prediction block $Pred_L$ may be set as $P_L\{A,B,C,D\}=\{1/4,1/8,1/16,1/32\}$.

On the contrary, in the case of the first prediction block $Pred_C$, the weight may be set so that the weight tends to decrease as being closer to the boundary of the block. For example, the weight of the first prediction block $Pred_C$ may be set as $P_C\{A,B,C,D\}=\{3/4,7/8,15/16,31/32\}$.

Referring to FIG. 19(*b*), in the 4×2 and 2×4 block units, the second prediction block generated according to the prediction mode of the left neighboring block may be referred to as $Pred_L$ and the first prediction block generated according to the prediction mode of the current block may be referred to as $Pred_C$.

In an embodiment of the present invention, the weight may be set so that the weight of the second prediction block $Pred_L$ tends to increase as being closer to the boundary of the block. For example, the weight of the second prediction block $Pred_L$ may be set as $P_L\{A,B\}=\{1/4,1/8\}$.

On the contrary, in the case of the first prediction block $Pred_C$, the weight may be set so that the weight tends to decrease as being closer to the boundary of the block. For example, the weight of the first prediction block $Pred_C$ may be set as $P_C\{A,B\}=\{3/4,7/8\}$.

The present invention is not limited thereto and may be defined to have a different weight tendency from the above embodiments. In addition, even when applied in units of lines or pixels rather than blocks, the weight may vary depending on the pixel position.

FIG. 20 illustrates a method for applying the weight according to a similarity of the prediction mode, as another embodiment to which the present invention is applied.

In the present invention, the weight may be set differently based on the similarity between the prediction mode of the current block and the prediction mode of the neighboring block.

FIG. 20(a) illustrates a case where the similarity between the prediction mode of the current block and the prediction mode of the neighboring block is high and FIG. 20(b) illustrates a case where the similarity between the prediction mode of the current block and the prediction mode of the neighboring block is low.

When the current block and the neighboring block have a prediction mode in a similar direction, an error between the boundary portion of the current block and the boundary portion of the neighboring block tends to be small. In this case, in the present invention, the weight of the current block may be set higher than that of the neighboring block.

On the contrary, when the directionalities of the current block and the neighboring block according to the prediction mode are not similar to each other, the error between the boundary portion of the current block and the boundary portion of the neighboring block tends to be large. In this case, in the present invention, the weight for the neighboring block may be set higher than that of the neighboring block.

For example, when the number of intra modes is 35, 10 represents a vertical direction and 26 represents a horizontal direction.

As illustrated in FIG. 20(a), when the prediction mode of the current block is 26 and the prediction mode of the neighboring block is 30, it can be seen that both the prediction modes of the current block and the neighboring block are the prediction modes in the horizontal direction and have a relatively high similarity, and as a result, the weight for the current block may be set higher than that of the neighboring block. For example, the weight of the first prediction block $Pred_C$ for the current block may be set as $P_C\{A,B,C,D\}=\{3/4,7/8,15/16,31/32\}$ and the weight of the second prediction block $Pred_L$ for the neighboring block may be set as $P_L\{A,B,C,D\}=\{1/4,1/8,1/16,1/32\}$.

On the contrary, as illustrated in FIG. 20(b), when the prediction mode of the current block is 26 and the prediction mode of the neighboring block is 10, the current block is the prediction mode in the horizontal direction and the neighboring block is the prediction mode in the vertical direction, and as a result, it can be seen that the similarity of both the prediction modes is relatively low. For example, the weight of the first prediction block $Pred_C$ for the current block may be set as $P_C\{A,B,C,D\}=\{2/4,2/8,1/16,1/32\}$ and the weight of the second prediction block $Pred_L$ for the neighboring block may be set as $P_L\{A,B,C,D\}=\{2/4,6/8,15/16,31/32\}$.

Further, the weight may be applied differently or an application range may be applied differently according to the similarity between the prediction modes of the block.

Further, when a difference in pixel value between the current block and the neighboring block is larger than a threshold value, the case is determined as a real edge rather than inter-block discontinuity, and as a result, a filter may not be applied.

FIG. 21 illustrates a syntax for describing a method for signaling whether to apply filtering to the boundary area of the prediction block, as another embodiment to which the present invention is applied.

In the present invention, whether to perform the boundary filtering may be determined based on the boundary filtering flag. Here, the boundary filtering flag indicates whether to perform the boundary filtering for the current block.

For example, the boundary filtering flag may be expressed as obip_flag and the boundary filtering flag may be separately defined at each level, such as a sequence parameter set, a picture parameter set, an adaptation parameter set, a sequence header, a CU, a PU, or the like.

When obip_flag==True as described above, the boundary filtering may be performed and when obip_flag==false as described above, the boundary filtering may not be performed.

Referring to FIG. 21(a), a syntax for signaling the boundary filtering flag at the sequence parameter set level is illustrated. In this case, the boundary filtering flag may be expressed as sps_obip_flag (S2110).

Referring to FIG. 21(b), a syntax for signaling the boundary filtering flag at the CU level is illustrated. In this case, the boundary filtering flag may be expressed as obip_flag (S2130) and the boundary filtering flag at the CU level may be defined under a predetermined condition. For example, when the boundary filtering is performed at a level higher than the CU level (!sps_obip_flag) and/or when the block size is not larger than 4 (log2CbSize<=4), the boundary filtering flag may be defined at the CU level (S2120)

As an embodiment, the following methods may be applied to whether to perform the boundary filtering at the CU level.

(i) The boundary filtering flag may exist or not exist at the CU or PU level.

(ii) The boundary filtering flag may exist or not exist according to the block size.

(iii) The boundary filtering flag may exist or not exist according to a partition mode of the prediction block.

(iv) The boundary filtering flag may exist or not exist according to the prediction mode of the block.

For example, when the size of the CU is larger than 16×16 or is 2N×2N, the boundary filtering may be continuously performed, other wise, the boundary filtering flag may be transmitted.

Further, when the current block has a non-directional prediction mode such as a DC prediction mode or a planar prediction mode, the boundary filtering may not be performed.

As described above, the embodiments described in the present invention may be performed by being implemented on a processor, a micro processor, a controller or a chip. For example, the functional units depicted in FIG. 1 and FIG. 2 may be performed by being implemented on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method for decoding a video signal by an apparatus, the method comprising:
   generating a first prediction block based on a prediction mode of a current block;
   checking a prediction mode of a neighboring block adjacent to the current block;
   generating a second prediction block based on the prediction mode of the neighboring block;
   generating a final prediction block based on applying a weight to the first prediction block and the second prediction block; and
   reconstructing the video signal based on the final prediction block,
   wherein the weight is determined based on a similarity between the prediction mode of the current block and the prediction mode of the neighboring block.

2. The method of claim 1, wherein the checking further includes
   checking whether an upper neighboring block adjacent to an upper boundary of the current block and/or a left neighboring block adjacent to a left boundary is present, and
   checking whether the upper neighboring block and/or the left neighboring block is available.

3. The method of claim 2, wherein whether the upper neighboring block and/or the left neighboring block is available is determined based on whether the prediction mode of the upper neighboring block and/or the left neighboring block is the same as the prediction mode of the current block.

4. The method of claim 1, wherein when a plurality of neighboring blocks is present, the prediction mode of the neighboring block is set as one representative mode based on a specific criterion.

5. The method of claim 4, wherein the specific criterion is determined based on at least one of a position of the neighboring block, a most probable prediction mode, an intermediate prediction mode, or a block size.

6. The method of claim 1, wherein in the generating of the second prediction block, when a reference sample is not available, the second prediction block is generated based on the reference sample at another position.

7. The method of claim 1, wherein the weight applied to the second prediction block has a larger weight value as being closer to a boundary of a block.

8. The method of claim 1, wherein based on the similarity between the prediction mode of the current block and the prediction mode of the neighboring block is equal to or more than a specific value, the weight of the current block is set to be higher than the neighboring block, and
   wherein based on the similarity between the prediction mode of the current block and the prediction mode of the neighboring block is less than the specific value, the weight of the neighboring block is configured to be higher than the current block.

9. The method of claim 1, further comprising:
   obtaining a boundary filtering flag representing whether boundary filtering is performed at a specific level,
   wherein the checking is performed based on the boundary filtering is performed at the specific level according to the boundary filtering flag.

10. An apparatus for decoding a video signal, the apparatus comprising:
    a processor configured to
    generate a first prediction block based on a prediction mode of a current block,
    check a prediction mode of a neighboring block adjacent to the current block,
    generate a second prediction block based on the prediction mode of the neighboring block,
    generate a final prediction block based on applying a weight to the first prediction block and the second prediction block, and
    reconstruct the video signal based on the final prediction block,
    wherein the weight is determined based on a similarity between the prediction mode of the current block and the prediction mode of the neighboring block.

11. The apparatus of claim 10, wherein when the prediction mode of the neighboring block is the same as the prediction mode of the current block, the second prediction block is generated based on the prediction mode of the neighboring block.

12. The apparatus of claim 10, wherein when a plurality of neighboring blocks is present, the prediction mode of the neighboring block is set as one representative mode based on a specific criterion.

13. The apparatus of claim 10, wherein the processor is further configured to
    obtain a boundary filtering flag representing whether boundary filtering is performed at a specific level.

14. An apparatus for encoding a video signal, the apparatus comprising:
a processor configured to
generate a first prediction block based on a prediction mode of a current block,
check a prediction mode of a neighboring block adjacent to the current block,
generate a second prediction block based on the prediction mode of the neighboring block,
generate a final prediction block based on applying a weight to the first prediction block and the second prediction block, and
encode the video signal based on the final prediction block,
wherein the weight is determined based on a similarity between the prediction mode of the current block and the prediction mode of the neighboring block.

* * * * *